United States Patent
Ohwa

(10) Patent No.: US 10,223,031 B2
(45) Date of Patent: Mar. 5, 2019

(54) MEMORY CONTROL APPARATUS AND MEMORY CONTROL METHOD

(71) Applicant: CANON KABUSHIKI KAISHA, Tokyo (JP)

(72) Inventor: Yasushi Ohwa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/487,748

(22) Filed: Apr. 14, 2017

(65) Prior Publication Data

US 2017/0300271 A1    Oct. 19, 2017

(30) Foreign Application Priority Data

Apr. 18, 2016 (JP) .................... 2016-082746

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0611* (2013.01); *G06F 3/0673* (2013.01); *G06F 12/023* (2013.01); *G06F 12/0207* (2013.01); *G06F 12/0223* (2013.01); *G06F 2212/455* (2013.01)

(58) Field of Classification Search
CPC ............. G06F 13/4282; G06F 13/4022; G06F 3/0656; G06F 3/0659; G06F 3/0611; G06F 3/0673
See application file for complete search history.

(56) References Cited

U.S. PATENT DOCUMENTS

| 5,480,236 A * | 1/1996 | Kawaoka | G06K 15/02 345/531 |
| 6,557,086 B1 * | 4/2003 | Tamura | H03M 9/00 348/E5.062 |
| 6,609,845 B1 * | 8/2003 | Ninomiya | B41J 11/008 347/20 |
| 2004/0252206 A1 * | 12/2004 | Tsumura | H04N 5/772 348/231.99 |
| 2012/0110224 A1 * | 5/2012 | Tanaka | G06F 5/06 710/57 |

FOREIGN PATENT DOCUMENTS

JP    2008-117135 A    5/2008

* cited by examiner

*Primary Examiner* — Arvind Talukdar
(74) *Attorney, Agent, or Firm* — Carter, Deluca, Farrell & Schmidt, LLP

(57) ABSTRACT

A memory control apparatus including: a writing unit configured to output a write request for writing to a memory and issues a first event every time a write operation of each of the first blocks is completed; a reading unit configured to output a readout request for reading of image data that has been written to the memory by the writing unit and issues a second event every time a readout operation of the second block is completed; and a controller that performs a process of incrementing a count value in response to the first event, performs a process of decrementing the count value in response to the second event, and controls whether to permit the write request and the readout request, respectively, based on the count value.

11 Claims, 18 Drawing Sheets

MEMORY CONTROL APPARATUS AND MEMORY CONTROL METHOD

BACKGROUND OF THE INVENTION

Field of the Invention

The present invention relates to a memory control apparatus and a memory control method.

Description of the Related Art

In recent years, the number of pixels of an imaging device used for a digital camera or the like has increased up to several tens of millions. Due to an increase in the number of pixels of an imaging device, a longer time is required to write and read out image data acquired by the imaging device to/from a memory. In order to reduce the time required to perform writing and readout to/from a memory, a proposed technique is to, immediately after writing image data from an imaging device to a memory, read out the image data obtained from the memory to perform image processing or the like, for example. In this case, such control is performed that a readout address does not overtake a writing address. Further, a technique of control so that a readout address does not overtake a writing address also in a case of processing divided image data is proposed (see Japanese Patent Application Laid-open No. 2008-117135).

In the conventional art, however, chase control on a memory may not be properly performed when blocks used for writing to the memory and blocks used for readout from the memory are different in the size and the number.

SUMMARY OF THE INVENTION

According to an aspect of an embodiment, there is provided a memory control apparatus including: a writing unit configured to output a write request for writing to a memory and, in response to the write request being permitted, writes image data to the memory, wherein a plurality of first blocks are included in one frame of image data to be written to the memory by the writing unit, and the writing unit issues a first event every time a write operation of each of the first blocks is completed; a reading unit configured to output a readout request for reading of image data that has been written to the memory by the writing unit and, in response to the readout request being permitted, reads out the image data from the memory, wherein, while image data of one frame is being written in the memory by the writing unit, the reading unit outputs a readout request for the image data of the one frame written to the memory, a second block is included in one frame of the image data read out from the memory by the reading unit, and the reading unit issues a second event every time a readout operation of the second block is completed; and a controller that performs a process of incrementing a count value in response to the first event, performs a process of decrementing the count value in response to the second event, and controls whether to permit the write request and the readout request, respectively, based on the count value.

According to another aspect of an embodiment, there is provided a memory control method including: outputting a write request for writing to a memory and, in response to the write request being permitted, writing image data to the memory, wherein a plurality of first blocks are included in one frame of image data to be written to the memory, and a first event is issued every time a write operation of each of the first blocks is completed; outputting a readout request for reading of image data that has been written to the memory and, in response to the readout request being permitted, reading out the image data from the memory, wherein, while image data of one frame is being written to the memory, a readout request for image data of the one frame written to the memory is output, a second block is included in one frame of the image data read out from the memory, and a second event is issued every time a readout operation of the second block is completed; and performing a process of incrementing a count value in response to the first event, performing a process of decrementing the count value in response to the second event, and controlling whether to permit the write request and the readout request, respectively, based on the count value.

Further features of the present invention will become apparent from the following description of exemplary embodiments with reference to the attached drawings.

DESCRIPTION OF THE EMBODIMENTS

Figure 1:
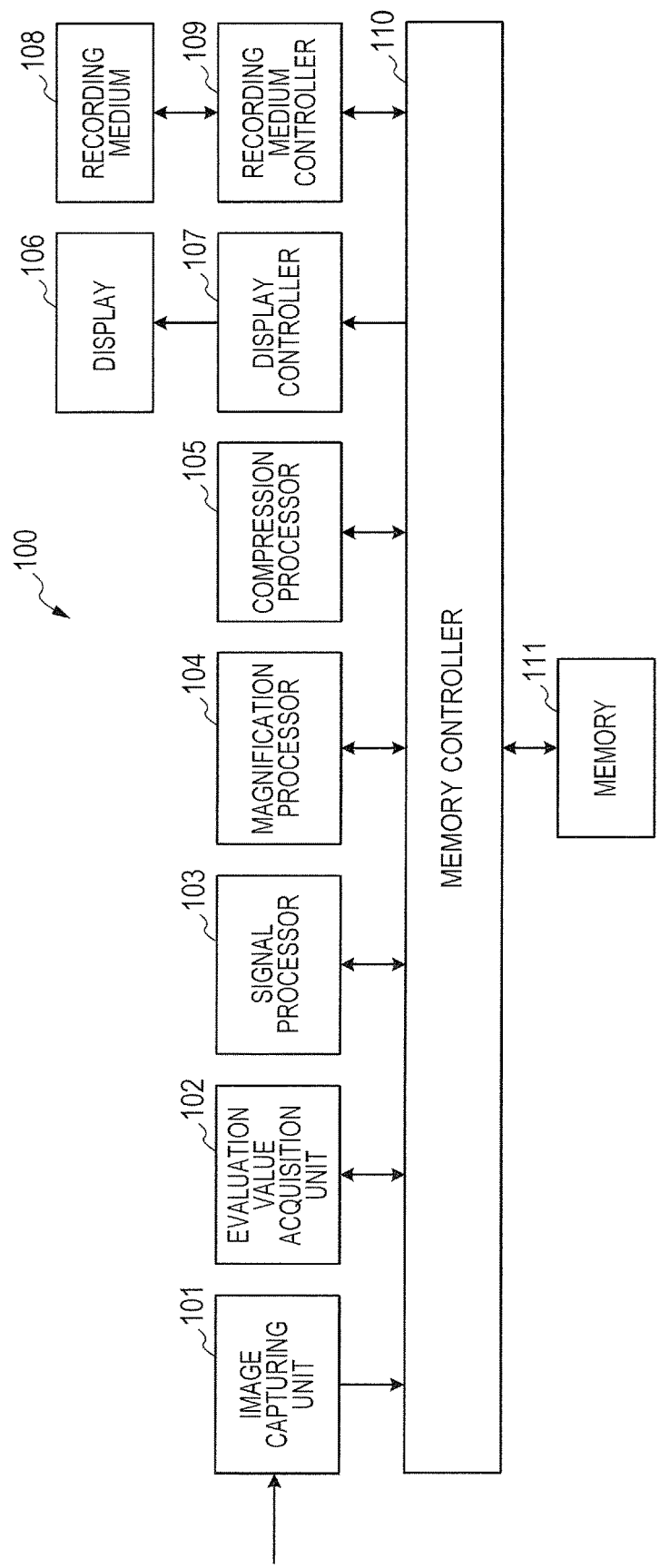
FIG. 1 is a block diagram illustrating a configuration of an imaging apparatus including a memory control apparatus according to a first embodiment.

Exemplary embodiments of the present invention are hereinafter described in detail with reference to the attached drawings. Note that the present invention is not limited to the following embodiments and can be properly modified within the scope not departing from its spirit. Further, in the drawings described below, elements having the same function are labeled with the same reference numerals, and description thereof may be omitted or simplified.

First Embodiment

A memory control apparatus and a memory control method according to the first embodiment of the present invention will be described by using the drawings.

While embedded in an imaging apparatus, for example, the memory control apparatus according to the present embodiment is not limited thereto. FIG. 1 is a block diagram illustrating a configuration of an imaging apparatus 100 including a memory control apparatus according to the present embodiment. An image capturing unit (image sensor) 101 converts an optical image passing through an optical lens, an aperture, and the like (not illustrated) into an electrical signal to generate an image (image data, an image signal). In the present embodiment, the image capturing unit 101 outputs motion image data whose one frame corresponds to 1920 horizontal pixels by 1080 vertical pixels and 60 frames per second (fps). An evaluation value acquisition unit 102 calculates a histogram or an integrated value of each area for an image acquired by the image capturing unit 101. An evaluation value acquired by the evaluation value acquisition unit 102 is used for exposure control, white balance control, or the like in the imaging apparatus (a camera) 100. A signal processor 103 applies various image processing such as a noise removal process, a gamma correction process, an interpolation process, a matrix conversion process, or the like to an image acquired by the image capturing unit 101. A magnification processor 104 performs a process for converting a resolution (the number of pixels) of an image (image data) processed by the signal processor 103 into a resolution for display or a resolution for recording, that is, performs a magnification process. A compression processor 105 performs a process for compressing image data into recording data, that is, a compressing process. As a display (a monitor) 106, a liquid crystal panel or the like is used, for example. A display controller 107 performs control for displaying image data for display on a display 106. A recording medium 108 is for storing compressed image data and the like and may be a memory card or the like, for example. A recording medium controller 109 performs write control and readout control of data to/from the recording medium 108.

A memory controller 110, that is, the memory control apparatus according to the present embodiment inputs and outputs data to/from the image capturing unit 101, the evaluation value acquisition unit 102, the signal processor 103, the magnification processor 104, the compression processor 105, the display controller 107, or the recording medium controller 109. The memory controller 110 performs write control and readout control of the above data in/from a memory 111. The memory 111 is a storage unit that temporarily stores an image acquired by the image capturing unit 101, an image for display, or the like and may be a Dynamic Random Access Memory (DRAM) or the like, for example. As described above, the evaluation value acquisition unit 102 divides a frame into a plurality of areas and acquires evaluation values on an area basis. Further, in order to perform filtering processes on a plurality of pixels in the horizontal direction and the vertical direction, respectively, the signal processor 103 and the magnification processor 104 have a memory that stores images for a plurality of lines in the vertical direction. In order to reduce the memory capacity, the signal processor 103 divides each horizontal line of a screen into a plurality of areas and further divides these areas into a plurality of areas in the vertical direction for various processes. In such a way, the evaluation value acquisition unit 102 or otherwise the signal processor 103 divides each frame into a plurality of areas (blocks) and may access the memory 111 in a unit of block. Therefore, in the present embodiment, each frame is divided into a plurality of blocks, and writing and readout of data in/from the memory 111 is controlled in a unit of block. Moreover, in order to reduce delay due to a process, the present embodiment performs chase control in a unit of block to read out data of a block where writing of data has been completed.

Figure 2:
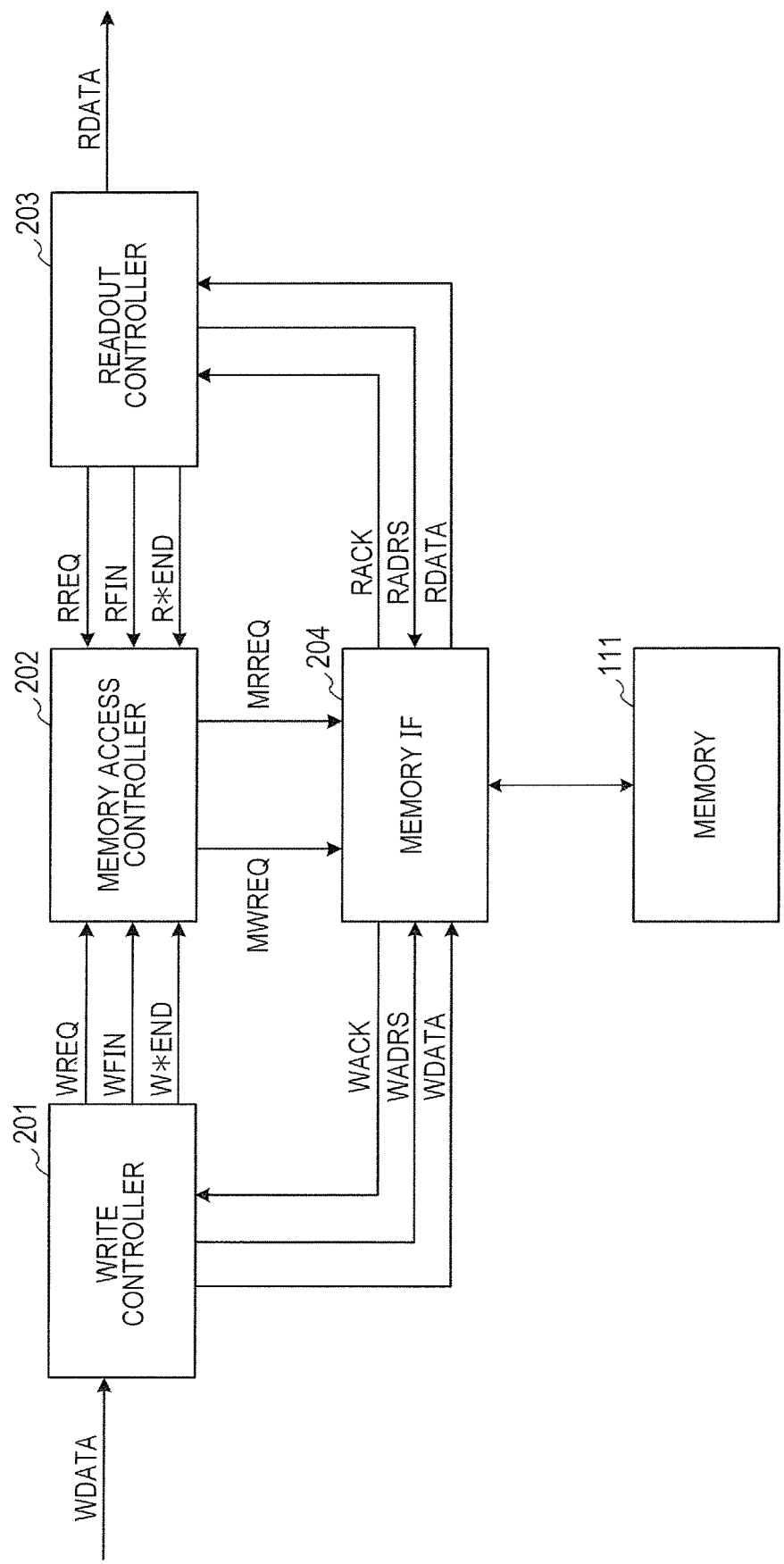
FIG. 2 is a block diagram illustrating a configuration of the memory control apparatus according to the first embodiment.

FIG. 2 is a block diagram illustrating a configuration of the memory controller 110 according to the present embodiment. A write controller (an access unit) 201 performs control regarding a write access to the memory 111. The write controller 201 performs write operation of a plurality of divided blocks in a predetermined order. In response to receiving write data WDATA such as image data from the signal processor 103, the magnification processor 104, or the like, the write controller 201 outputs, to a memory access controller 202, a write request signal WREQ for requesting a write access. The write controller 201 may support write operation on a divided block basis and may manage the size of divided blocks used for write operation or memory addresses corresponding to divided blocks used for write operation. Note that divided blocks will be described later in detail. The write controller 201 outputs various events W*END to the memory access controller 202 every time write operation for a predetermined number of blocks is completed for the memory 111. Note that these events W*END will be described later in detail. The memory interface (IF) 204 outputs, to the write controller 201, an acknowledgement signal WACK for a write request signal WREQ. In response to the WACK from the memory IF 204, the write controller 201 outputs a write address WADRS and/or write data WDATA to the memory IF 204. At the completion of write operation, specifically, at the completion of write operation for one frame, for example, the write controller 201 turns a write operation completion signal WFIN to a High level. Note that, while description is provided here with an example of a case of turning the write operation completion signal WFIN to a High level at the completion of write operation for one frame, the embodiment is not limited thereto. For example, the write operation completion signal WFIN may be turned to a High level at the completion of write operation for multiple frames.

A readout controller (an access unit) 203 performs control regarding a readout access. The readout controller 203 performs readout operation for a plurality of divided blocks in a predetermined order. When there is an available space in an image buffer (buffer memory) (not illustrated) provided within the readout controller 203 and readout operation has not been completed, the readout controller 203 performs processes described below. That is, the readout controller 203 outputs, to the memory access controller 202, a readout request signal RREQ for requesting a readout access. The readout controller 203 may support readout operation on a divided block basis and may manage the size of divided blocks used for readout operation or the memory addresses corresponding to divided blocks used for readout operation. The readout controller 203 outputs various events R*END to the memory access controller 202 every time readout operation for a predetermined block is completed for the memory 111. Note that these events R*END will be described later in detail. The memory IF 204 outputs, to the readout controller 203, an acknowledgement signal RACK to a readout request signal RREQ. In response to the acknowledgement RACK from the memory IF 204, the readout controller 203 outputs a readout address RADRS to the memory IF 204. The memory IF 204 reads out data of an address corresponding to the readout address RADRS from the memory 111 and outputs the read out data RDATA to the readout controller 203. The readout controller 203 outputs readout data RDATA, such as reads out image data or the like, to the signal processor 103, the magnification processor 104, or the like. At the completion of readout operation, specifically, at the completion of readout operation for one frame, for example, the readout controller 203 turns a readout operation completion signal RFIN to a High level. Note that, while description is provided here with an example of a case of turning the readout operation completion signal RFIN to a High level at the completion of readout operation for one frame, the embodiment is not limited thereto. For example, the readout operation completion signal RFIN may be turned to a High level at the completion of readout operation for multiple frames.

The memory access controller 202 performs chase control that is control of performing, as soon as data writing of a divided block is completed, readout of data of the divided block. As described above, the write request signal WREQ, the events (scan events) W*END, and the write operation completion signal WFIN are input to the memory access controller 202 from the write controller 201. Further, the readout request signal RREQ, the events (scan events) R*END, and the readout operation completion signal RFIN are input to the memory access controller 202 from the readout controller 203. The memory access controller 202 performs chase control based on these inputs. That is, the memory access controller 202 properly masks a readout request signal MRREQ such that readout is not performed from a memory address where data writing is not completed. Further, the memory access controller 202 properly masks a write request signal MWREQ to be output to the memory IF 204 such that write operation of data is entered after the completion of readout from a memory address where readout of data is available. The memory access controller 202 accurately performs chase control by masking the write request signal MWREQ and/or the readout request signal MRREQ. Note that, the chase control will be described later in detail. The memory IF 204 performs a write access to the memory 111 and/or a readout access from the memory 111 according to the write request signal MWREQ and/or the readout request signal MRREQ from the memory access controller 202.

Figure 3:
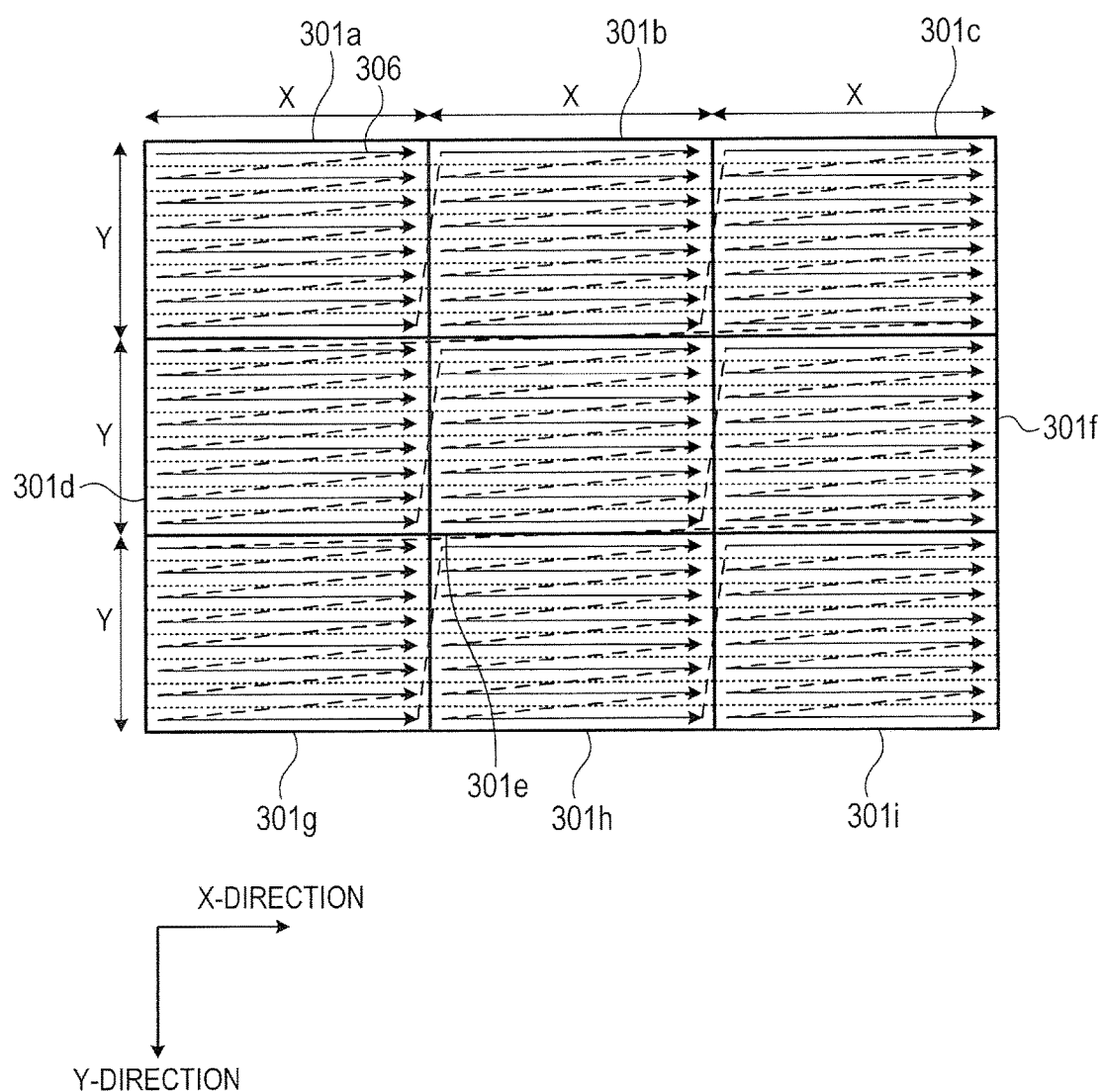
FIG. 3 is a diagram conceptually illustrating the order of scans in write accesses or readout accesses.

FIG. 3 is a diagram conceptually illustrating the order of scans in a write access or a readout access. FIG. 3 conceptually illustrates a virtual address space (address area) corresponding to an image. As illustrated in FIG. 3, an address area for one frame is divided into a plurality of blocks, and thereby divided blocks 301a to 301i are defined. Here, description will be provided with an example of a case control where an address area for one frame is divided into three in the horizontal direction and the vertical direction, respectively, and each of the square divided blocks 301a to 301i defined by division are used as a unit of write operation and readout operation to perform chase control. Note that, in this embodiment, the reference numerals 301a to 301i will be used when individual divided block is described and the reference numeral 301 will be used when a general divided block is described. The size (the number of pixels) in the horizontal direction of one frame of an image is 3X and the number of pixels in the vertical direction of one frame of an image is 3Y. Since the divided block 301 is obtained by dividing one frame of an image into three in the horizontal direction and the vertical direction, respectively, the number of pixels in the horizontal direction of the divided block 301 is X, and the number of pixels in the vertical direction of the divided block 301 is Y. The direction from the left toward the right in FIG. 3 is defined as an X-direction, and the downward direction in FIG. 3 is defined as a Y-direction. Arrows in FIG. 3 each represent the scanning direction in a write access or a readout access. Broken lines in FIG. 3 each represent a jump of scan coordinates.

As described above, in the present embodiment, chase control is performed by using a divided block 301 as a unit of write operation or readout operation. Specifically, for example, the divided block 301a located in the left-upper in FIG. 3 is accessed. After the completion of the access to the divided block 301a, the divided block 301b located on the right side of the divided block 301a is accessed. After the completion of the access to the divided block 301b, the divided block 301c located on the right side of the divided block 301b is accessed. In such a way, three neighboring divided blocks 301a to 301c located at the top in the screen are sequentially accessed from the left side to the right side. A block including the divided blocks 301a to 301c is called a first block row. After the completion of the access to the divided blocks 301a to 301c located on the first block row, three neighboring divided blocks 301d to 301f located at the second row from the top in the screen are sequentially accessed from the left side to the right side. A block including the divided blocks 301d to 301f is called a second block row. After the completion of the access to the divided blocks 301d to 301f located on the second block row, three neighboring divided blocks 301g to 301i located at the third row from the top in the screen are sequentially accessed from the left side to the right side. A block including the divided blocks 301g to 301i is called a third block row. In such a way, all the divided blocks 301a to 301i are sequentially accessed.

Scans in the write access and the readout access will be more specifically described below. First, the first row of the divided block 301a is scanned. The coordinates of the head of the first row of the divided block 301a are (1, 1) and the coordinates of the tail of the first row of the divided block 301a are (X, 1). In a scan on the first row of the divided block 301a, the scan coordinates sequentially change from (1, 1) to (X, 1). After the completion of the scan to the first row of the divided block 301a, the second row of the divided block 301a is scanned. The coordinates of the head of the second row of the divided block 301a are (1, 2). Therefore, when moving from the scan of the first row of the divided block 301a to the scan of the second row of the divided block 301a, the scan coordinates jump from (X, 1) to (1, 2). Then, in the same manner, respective rows located within the divided block 301 are sequentially scanned with scan coordinates being sequentially jumped.

After the completion of the access to the divided block 301a, the divided block 301b located on the right side of the divided block 301a is accessed, as described above. The coordinates of the tail of the y-th row, which is the last row, of the divided block 301a are (X, Y). On the other hand, the coordinates of the top of the first row of the divided block 301b are (X+1, 1). Therefore, when moving from the access to the divided block 301a to the access to the divided block 301b, the scan coordinates jump from (X, Y) to (X+1, 1). Then, in the same manner, respective rows located within the divided block 301b are sequentially scanned.

After the completion of the access to the divided block 301b, the divided block 301c located on the right side of the divided block 301b is accessed, as described above. The coordinates of the tail of the Y-th row, which is the last row, of the divided block 301b are (2X, Y). On the other hand, the coordinates of the head of the first row of the divided block 301c are (2X+1, 1). Therefore, when moving from the access to the divided block 301b to the access to the divided block 301c, the scan coordinates jump from (2X, Y) to (2X+1, 1). Then, in the same manner, respective rows located within the divided block 301c are sequentially scanned.

After the completion of the scan to the divided blocks 301a to 301c located on the first block row, the divided blocks 301d to 301f located on the second block row are sequentially scanned as described above. The coordinates of the tail of the Y-th row, which is the last row, of the divided block 301c are (3X, Y). On the other hand, the coordinates of the head of the first row of the divided block 301d are (1, Y+1). Therefore, when moving from the access to the divided block 301c to the access to the divided block 301d, the scan coordinates jump from (3X, Y) to (1, Y+1). After the completion of the access to the divided blocks 301d to 301f located on the second block row, the divided blocks 301g to 301i located on the third block row are sequentially accessed, as described above. The coordinates of the tail of the Y-th row, which is the last row, of the divided block 301f are (3X, 2Y). On the other hand, the coordinates of the head of the first row of the divided block 301g are (1, 2Y+1). Therefore, when moving from the access to the divided block 301f to the access to the divided block 301g, the scan coordinates jump from (3X, 2Y) to (1, 2Y+1). In such a way, scans up to the coordinates (3X, 3Y) of the tail of the Y-th row, which is the last row, in the divided block 301i are performed. Thereby, scans on one frame of an image are completed.

Note that, while the case where respective divided blocks 301a to 301i are accessed in the above-described order has been exemplified, the order is not limited thereto. For example, an access to the divided block 301d may be performed after the completion of an access to the divided block 301a, and then an access to the divided block 301g may be performed. Then, accesses to the divided block 301b, the divided block 301e, and the divided block 301h may be sequentially performed, and then accesses to the divided block 301c, the divided block 301f, and the divided block 301i may be sequentially performed.

Next, the events W*END and R*END will be described by using FIG. 4A to FIG. 4E. FIG. 4A to FIG. 4E are diagrams illustrating respective events. FIG. 4A illustrates minimum access units and minimum-access-unit access completion events. The size of a minimum access unit 401 corresponds to the size of one word or the size of one burst length, for example. Each minimum-access-unit access completion event WEND is issued when the accessed address reaches the final address of each minimum access unit 401. Note that, in the present specification, the reference WEND will be used in the general description of a minimum-access-unit access completion event. On the other hand, a reference WWEND (see FIG. 5) will be used in the description of a minimum-access-unit access completion event in a specific write operation. Further, a reference RWEND (see FIG. 5) will be used in the description of the minimum-access-unit access completion event in a specific readout operation.

Figure 4B:
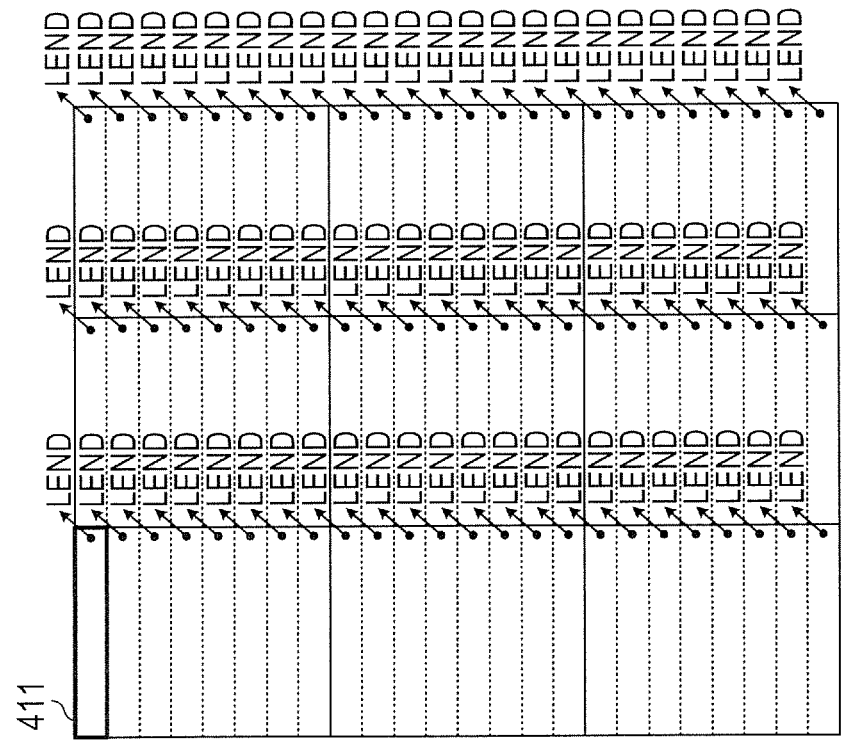
FIG. 4A, FIG. 4B, FIG. 4C, FIG. 4D, and FIG. 4E are diagrams illustrating respective events.
Figure 4A:
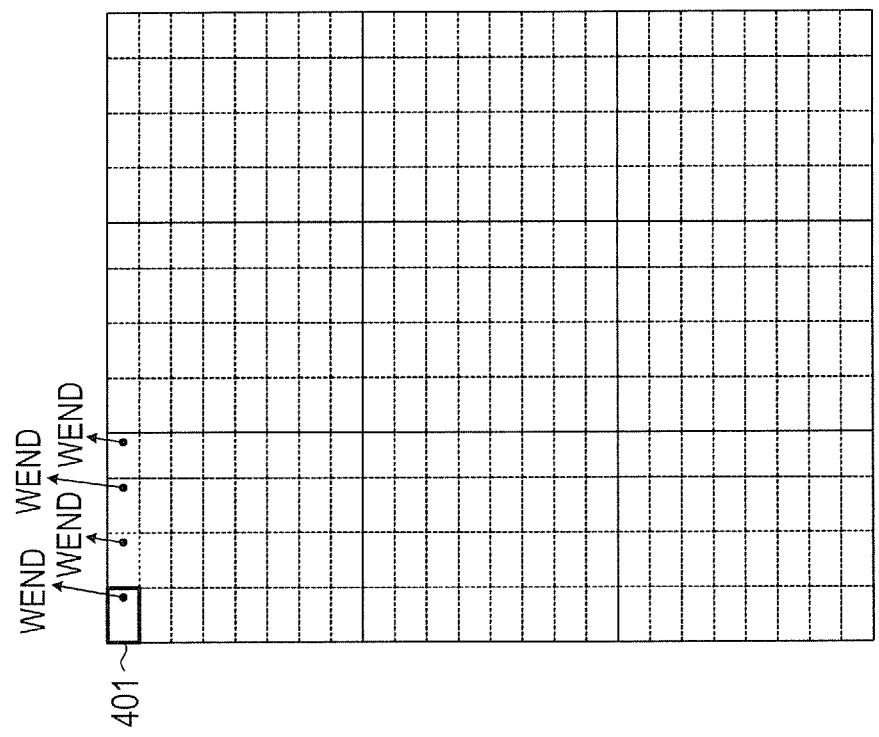

FIG. 4B is a diagram illustrating rows and row access completion events. Each one row 411 includes a plurality of minimum access units 401. Each row access completion event LEND is issued when the accessed address reaches the final address of each row 411. Note that, in the present specification, the reference LEND will be used in the general description of a row access completion event. On the other hand, a reference WLEND (see FIG. 5) will be used in the description of a row access completion event in a specific write operation, and a reference RLEND (see FIG. 5) will be used in the description of a row access completion event in a specific readout operation.

Figure 4D:
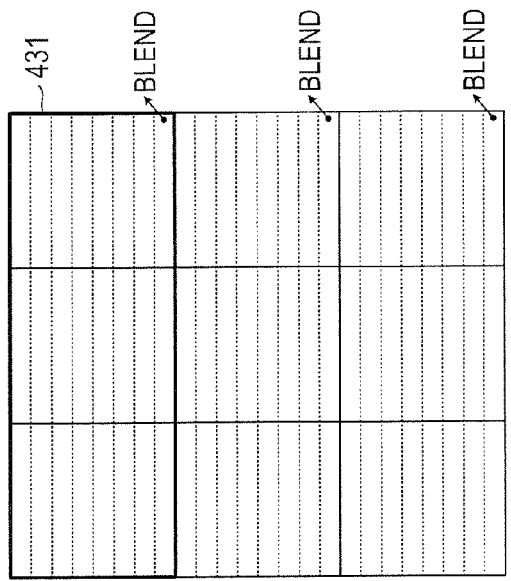
Figure 4C:
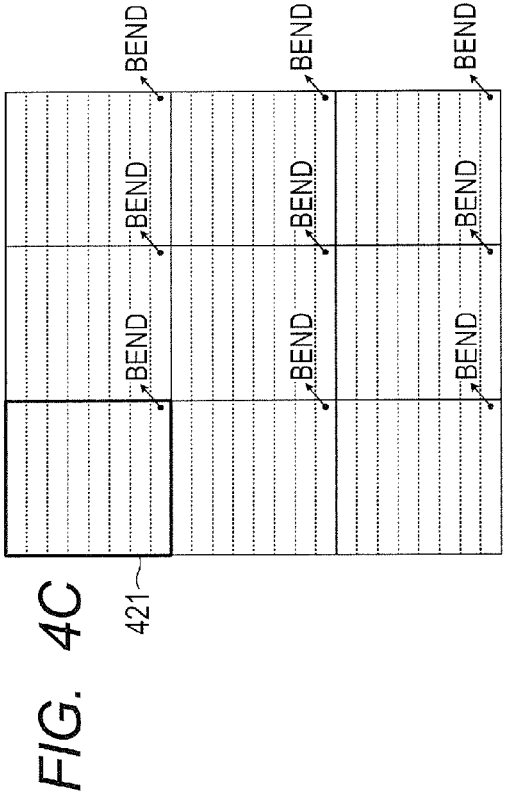

FIG. 4C is a diagram illustrating divided blocks and divided-block access completion events. Each one divided block 421 includes a plurality of rows 411. In FIG. 4C, each divided block 421 corresponds to a divided block 301 of FIG. 3. Each divided-block access completion event BEND is issued when the accessed address reaches the final address of each divided block 421. Note that, in the present embodiment, the reference BEND will be used in the general description of a divided-block access completion event. On the other hand, a reference WBEND (see FIG. 5) will be used in the description of a divided-block access completion event in a specific write operation, and a reference RBEND (see FIG. 5) will be used in the description of a divided-block access completion event in a specific readout operation.

FIG. 4D is a diagram illustrating block rows and block-row access completion events. Each one block row 431 includes a plurality of divided blocks 421 neighboring in the horizontal direction. Each block-row access completion event BLEND is issued when the accessed address reaches the final address of each block row 431. Note that, in the present specification, the reference BLEND will be used in the general description of a block-row access completion event. On the other hand, a reference WBLEND (see FIG. 5) will be used in the description of a block-row access completion event in a specific write operation, and a reference RBLEND (see FIG. 5) will be used in the description of a block-row access completion event in a specific readout operation.

Figure 4E:
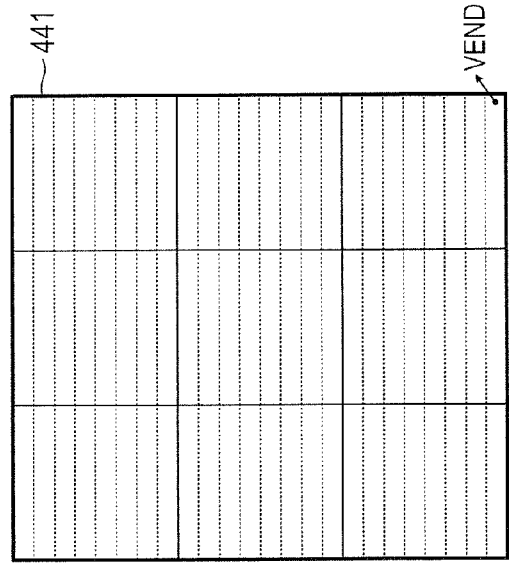

FIG. 4E is a diagram illustrating a frame and a frame access completion event. One frame 441 includes a plurality of block rows 431. A frame access completion event VEND is issued when the accessed address reaches the final address of the frame 441. Note that, in the present specification, the reference VEND will be used in the general description of a frame access completion event. On the other hand, a reference WVEND will be used in the description of a frame access completion event in a specific write operation, and a reference RVEND will be used in the description of a frame access completion event in a specific readout operation.

Figure 5:
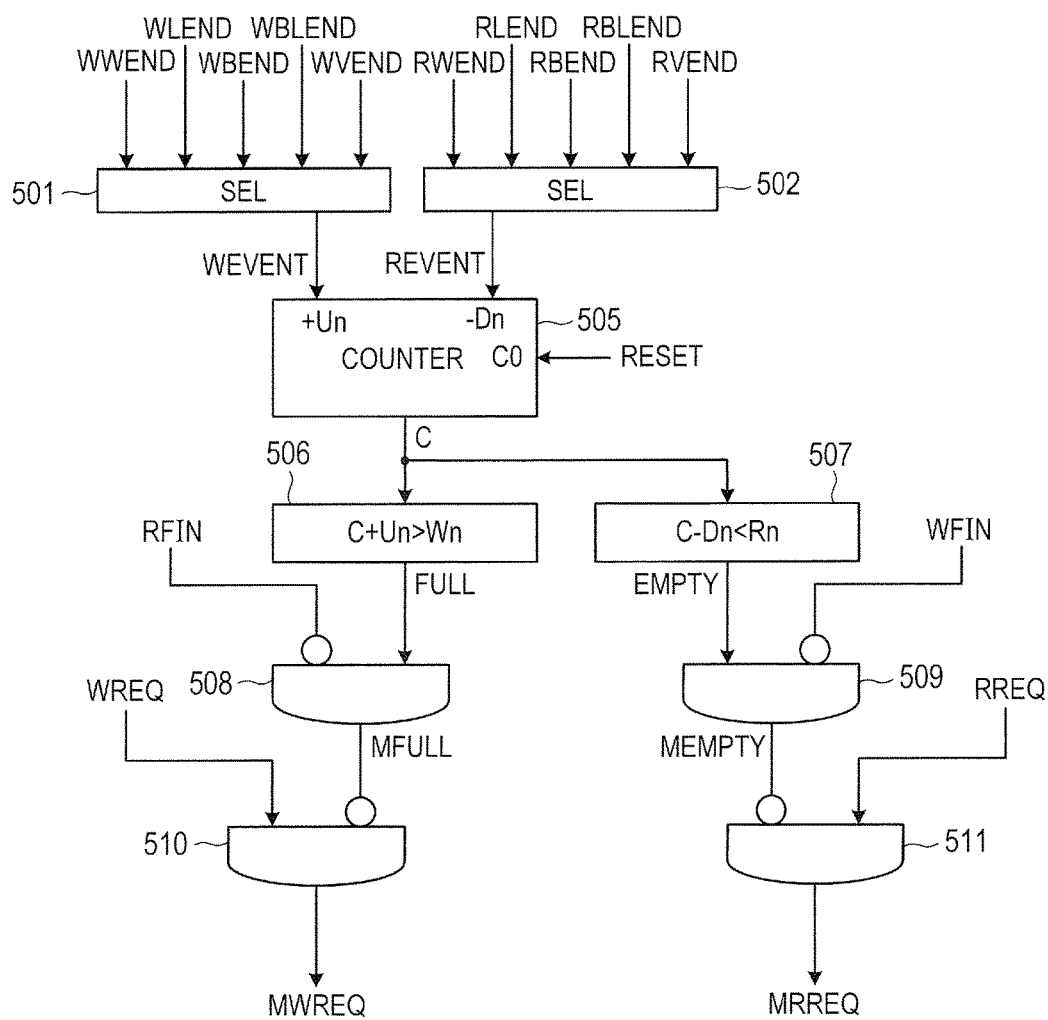
FIG. 5 is a diagram illustrating a configuration of a memory access controller.

FIG. 5 is a diagram illustrating a configuration of the memory access controller 202. The events WWEND, WLEND, WBEND, WBLEND, and WVEND output from the write controller 201 are input to a selector 501. The selector 501 performs selection based on parameter settings, for example. One of these events input to the selector 501 is selected by the selector 501, and the selector 501 outputs a write event WEVENT every time the selected event is issued. When chase control is performed using the divided block 421 as a unit, the divided-block access completion event WBEND that is issued every time the write access to the divided block 421 is completed is selected by the selector 501, for example.

The events RWEND, RLEND, RBEND, RBLEND, and RVEND output from the readout controller 203 are input to a selector 502. The selector 502 performs selection based on parameter settings, for example. One of these events input to the selector 502 is selected by the selector 502, and the selector 502 outputs a readout event REVENT every time the selected event is issued. When chase control is performed using the divided block 421 as a unit, the divided-block access completion event RBEND that is issued every time the readout access to the divided block 421 is completed is selected by the selector 502, for example.

The write event WEVENT output from the selector 501 is input to a count-up terminal +Un of an up-down counter 505. The readout event REVENT output from the selector 502 is input to a count-down terminal −Dn of the up-down counter 505. A reset signal may be input to a reset terminal C0 of the up-down counter 505. In response to the write event WEVENT being input to the up-down counter 505, the up-down counter 505 performs a count-up process that adds a predetermined count-up value Un to the current count value. Further, in response to the readout event REVENT being input to the up-down counter 505, the up-down counter 505 performs a count-down process that subtracts a predetermined count-down value Dn from the current count value. The up-down counter 505 outputs a count value C. In response to a reset signal being input to the up-down counter 505, the up-down counter 505 performs an initialization process to set the count value C to a predetermined initial value C0.

A comparator (a comparing unit) 506 determines whether or not a value (C+Un) obtained by summing the count value C and the count up value Un is greater than a threshold Wn. That is, the comparator 506 performs comparison based on the count value C and the threshold Wn. Here, the threshold Wn is a value in accordance with the image buffer capacity provided in the memory 111. When the addition value (C+Un) is greater than the threshold Wn as a result of comparison, it is determined that the image buffer provided in the memory 111 is in a FULL state and a further write access to the memory 111 is inhibited.

A mask logic (a mask function, a mask logic circuit, a mask unit) 508 masks a signal FULL output from the comparator 506 by using a readout operation completion signal RFIN indicating the completion of readout operation and thereby outputs a signal MFULL. When readout operation is completed, that is, when the readout operation completion signal RFIN is High level, the mask logic 508 masks (disables) the signal FULL output from the comparator 506. A mask logic 510 masks a write request signal WREQ output from the write controller 201 in accordance with the signal MFULL output from the mask logic 508 and thereby outputs a write request signal MWREQ. When the image buffer provided in the memory 111 is in a FULL state, the mask logic 510 masks the write request signal WREQ output from the write controller 201. The mask logic 510 outputs a write request signal MWREQ to the memory IF 204. In such a way, based on a comparison result by the comparator 506, the mask logics 508 and 510 mask the request for write operation to the memory 111 performed by the write controller 201.

A comparator 507 determines whether or not a value (C−Dn) obtained by subtracting the count-down value Dn from the count value C is smaller than a threshold Rn. That is, the comparator 507 performs comparison based on the count value C and the threshold Rn. Here, the threshold Rn is a value in accordance with the image buffer capacity provided in the memory 111. When the subtraction value (C−Dn) is smaller than the threshold Rn as a result of comparison, it is determined that the image buffer provided in the memory 111 is EMPTY and a further readout access to the memory 111 is inhibited.

A mask logic 509 masks a signal EMPTY output from the comparator 507 by using a write operation completion signal WFIN indicating completion of write operation and thereby outputs a signal MEMPTY. When the write operation completion signal WFIN is High level, the mask logic 509 disables the signal EMPTY output from the comparator 507. A mask logic 511 masks a readout request signal RREQ output from the readout controller 203 by using the signal MEMPTY output from the mask logic 509 and thereby outputs a readout request signal MRREQ. When the image buffer provided in the memory 111 is in an EMPTY state, the mask logic 511 masks the readout request signal RREQ output from the readout controller 203. The mask logic 511 outputs a readout request signal MRREQ to the memory IF 204. In such a way, based on a comparison result by the comparator 507, the mask logics 509 and 511 mask the request for readout operation to the memory 111 performed by the readout controller 203.

As discussed above, the memory access controller 202 increments or decrements the count value C based on the event W*END issued from the write controller 201 or the event R*END issued from the readout controller 203. Further, the memory access controller 202 increments or decrements the count value C according to an increment value or a decrement value in accordance with each of the event W*END issued from the write controller 201 and the event R*END issued from the readout controller 203. Further, based on the count value C, the memory access controller 202 selectively permits either one of an access (writing) to the memory 111 performed by the write controller 201 and an access (readout) to the memory 111 performed by the readout controller 203.

Next, respective parameters will be described. In this section, description will be provided with an example of a case where chase control is performed in a unit of a divided block by using the divided-block access completion event BEND (WBEND, RBEND) issued every time an access to the divided block 421 (see FIG. 4C) is completed.

Parameters used in the memory access controller 202 include the initial value C0, the count-up value Un, the count-down value Dn, the threshold Wn for the FULL, and the threshold Rn for the EMPTY. Respective parameter values are determined by the following equations (1) to (5), for example.

$$Un=RXN \qquad (1)$$

$$Dn=WXN \qquad (2)$$

$$Wn \geq Rn+Buf \qquad (3)$$

$$Rn=(WYN-RYN) \times Un \times WXN (\text{if } Rn<0, \text{then } Rn=0) \qquad (4)$$

$$Buf=(Dn-1)+Un \qquad (5)$$

In these equations, WXN is the number of divisions in the horizontal direction for a block used for write operation, WYN is the number of divisions in the vertical direction for a block used for write operation, RXN is the number of divisions in the horizontal direction on a block for readout operation, and RYN is the number of divisions in the vertical direction for a block used for readout operation.

When divided blocks are set to overlap with each other, the initial value C0 is set to a non-zero value. Also, when the way of division of blocks for writing and the way of division of blocks for readout are different from each other, the initial value C0 may be set to a non-zero value. Except these cases, the initial value C0 is set to zero, for example. In such a way, the initial value C0 is set based on the ways of division of blocks for writing and division of blocks for readout.

As described above, the increment value Un and the decrement value Dn are set based on the number of divisions of blocks. Note that, while parameter values are set based on the above-described equations in this example, the embodiment is not limited thereto.

Figure 6B:
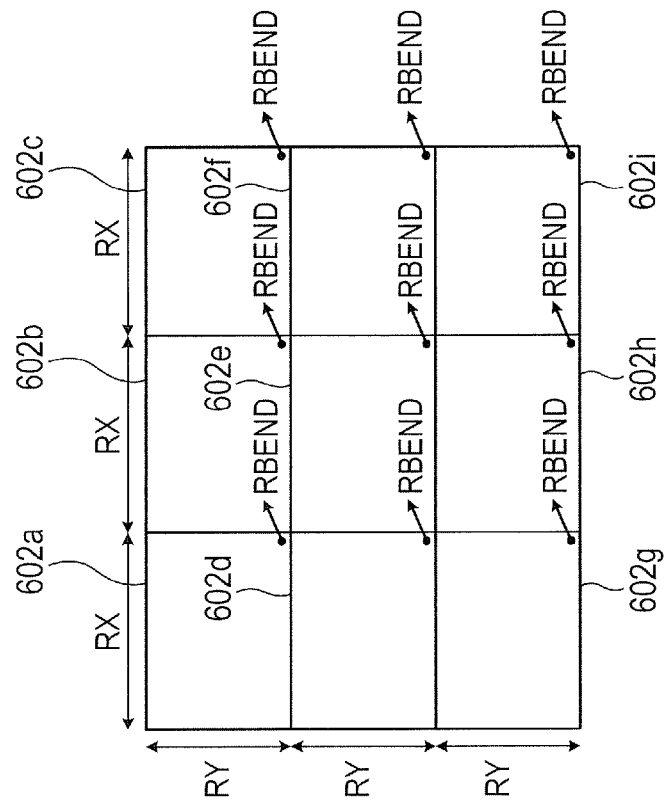
FIG. 6A, FIG. 6B, FIG. 6C, FIG. 6D, FIG. 6E, and FIG. 6F are diagrams conceptually illustrating examples of block division.
Figure 6A:
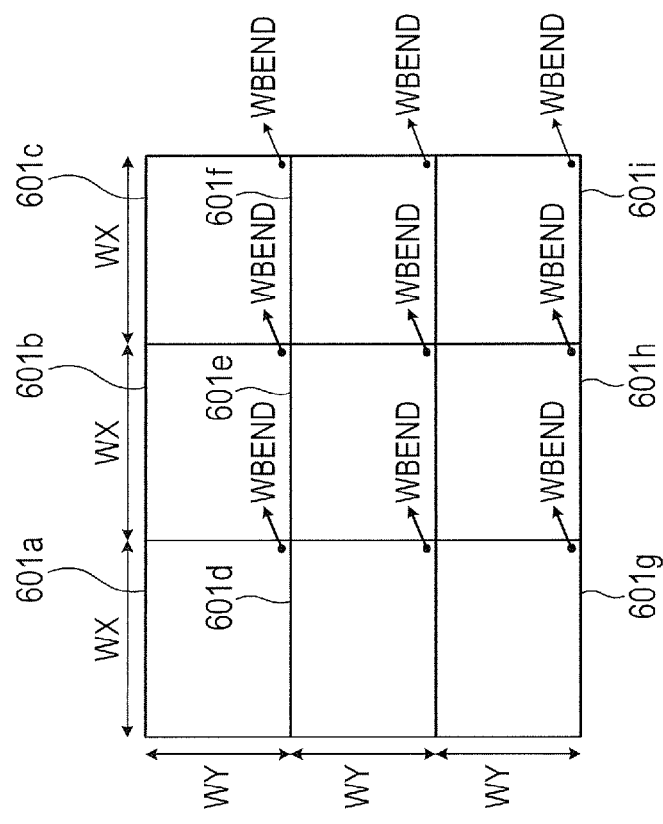

FIG. 6A to FIG. 6F are conceptually illustrate examples of block division. FIG. 6A to FIG. 6F conceptually illustrates virtual address space corresponding to one frame of an image. FIG. 6A and FIG. 6B illustrate an example in which the way of block division for write operation and the way of block division for readout operation are the same as each other, which corresponds to a case where the same number of divisions of blocks and the same block size are applied to a processor which performs writing of an image and a processor which performs readout of an image in FIG. 1, for example. FIG. 6A illustrates the block division for write operation, and FIG. 6B illustrates the block division for readout operation. In both of the block division for write operation and the block division for readout operation, each number of divisions WXN and RXN in the horizontal direction is three, and each number of divisions WYN and RYN in the vertical direction is three. The size (the number of pixels) WX in the horizontal direction of each of the divided blocks 601a to 601i for write operation and the size RX in the horizontal direction of each of divided blocks 602a to 602i for readout operation are equal to each other. The size WY in the vertical direction of each of the divided blocks 601a to 601i for write operation and the size RY in the vertical direction of each of the divided blocks 602a to 602i for readout operation are equal to each other. Note that, in the present specification, the reference numerals 601a to 601i and 602a to 602i will be used when describing an individual divided block, and the reference numerals 601 and 602 will be used when generally describing a divided block. In the example illustrated in FIG. 6A and FIG. 6B, respective parameter values are set as follows. That is, C0=0, Un=3, Dn=3, Wn=5, Rn=0, and Buf=5.

Figure 7A:
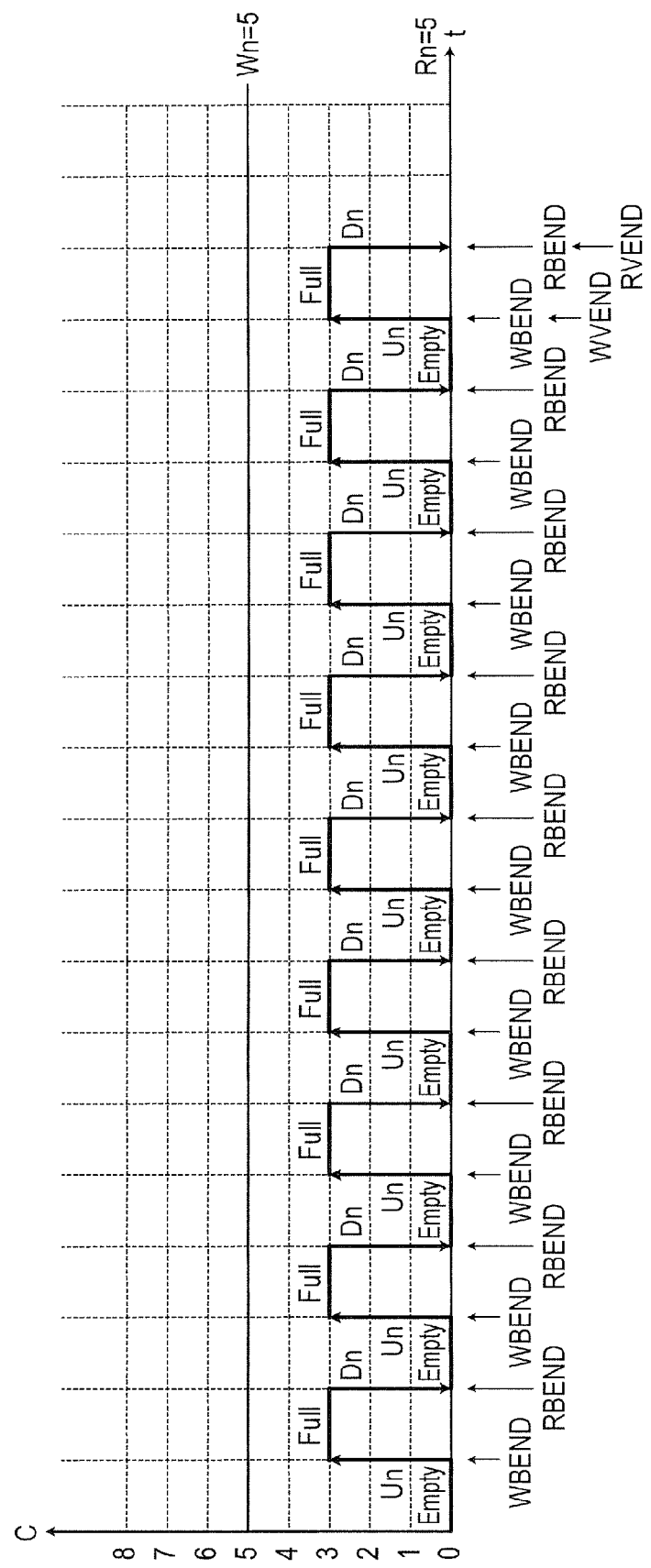
FIG. 7A, FIG. 7B, and FIG. 7C are time charts illustrating internal states of the memory access controller.
Figure 7B:
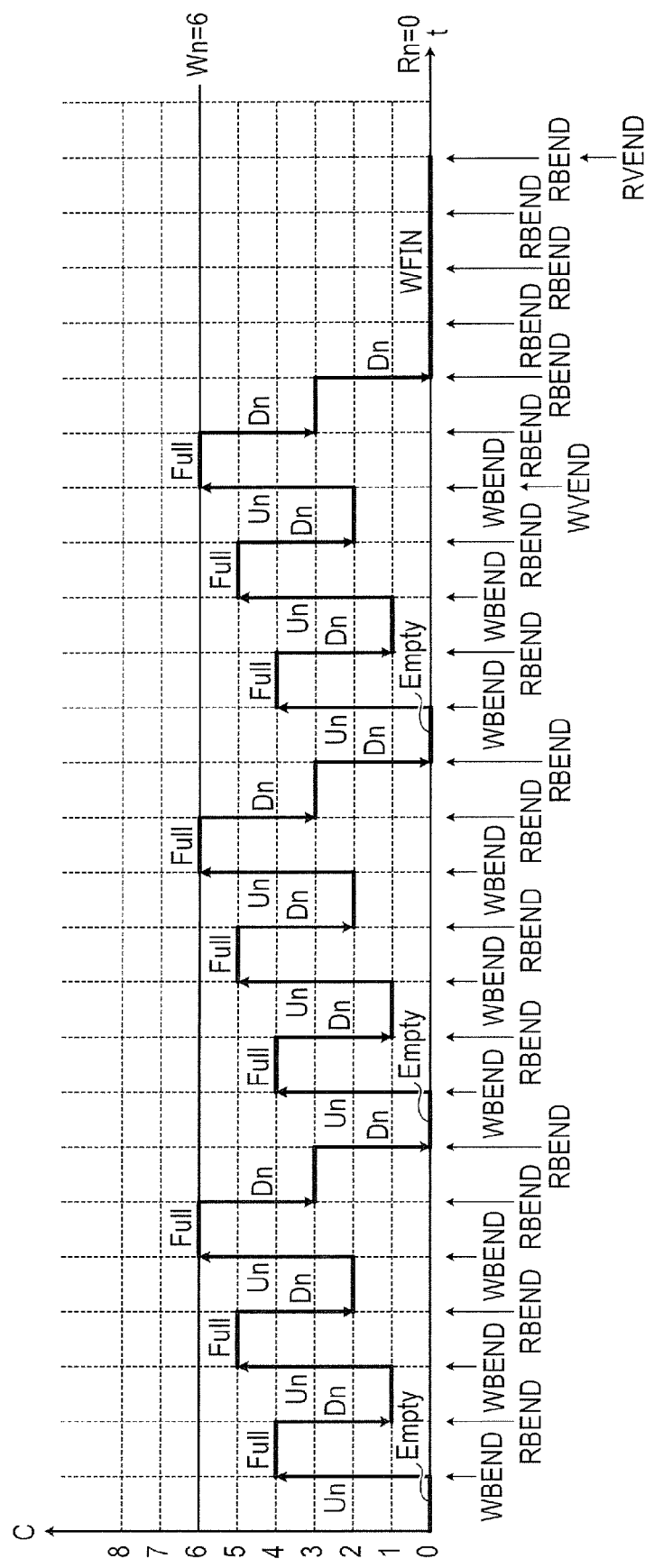
Figure 7C:
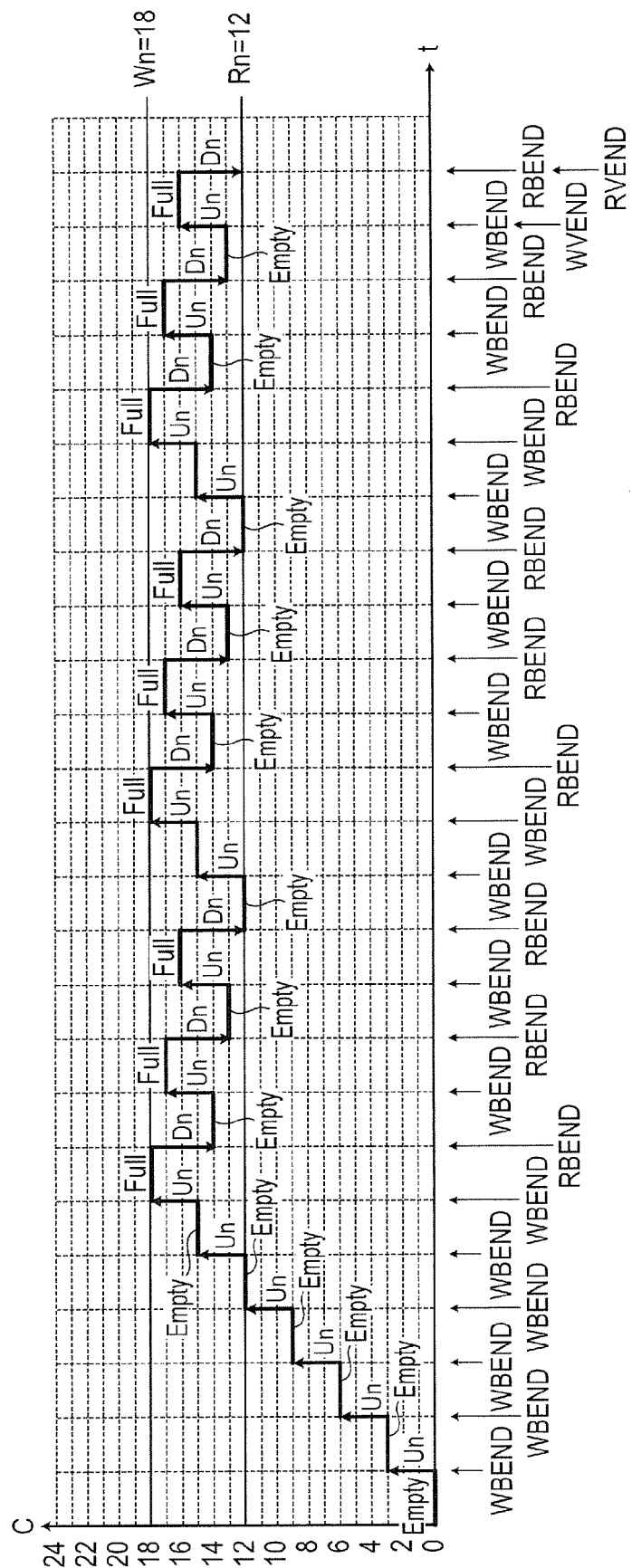

FIG. 7A is a time chart illustrating an internal state of the memory access controller 202. FIG. 7A corresponds to a case where blocks are divided as illustrated in FIG. 6A and FIG. 6B. Each vertical axis in FIG. 7A to FIG. 7C denotes the count value C output from the up-down counter 505. Each horizontal axis in FIG. 7A to FIG. 7C is a time axis. The labels "Full" in FIG. 7A to FIG. 7C indicate that the signal FULL output from the comparator 506 is High level, and the labels "Empty" in FIG. 7A to FIG. 7C indicate that the signal EMPTY output from the comparator 507 is High level. The labels "WFIN" in FIG. 7A to FIG. 7C indicate that the write operation completion signal WFIN output from the write controller 201 is High level. The labels "WBEND", "RBEND", WVEND", and "RVEND" illustrated with arrows in FIG. 7A to FIG. 7C indicate timings when these events are output from the write controller 201 or the readout controller 203 to the memory access controller 202.

First, an initial state will be described. In the initial state before writing of one frame of image data is started, the count value C in the up-down counter 505 is set as the initial value C0=0. Since C−Dn=−3 and Rn=0, the conditional expression C−Dn<Rn in the comparator 507 is satisfied and thus the signal EMPTY output from the comparator 507 is High level. As described above, the timing when the write operation completion signal WFIN output from the write controller 201 becomes High level is at the time of completion of write operation for one frame, for example. Therefore, before the completion of write operation for one frame, the write operation completion signal WFIN remains Low level. Thus, when the signal EMPTY output from the comparator 507 is High level, the signal MEMPTY output from the mask logic 509 is High level and the readout request signal RREQ is masked by the mask logic 511. In this state, even when the readout request signal RREQ is output from the readout controller 203 to the memory access controller 202, the readout request signal MRREQ output from the memory access controller 202 is maintained to be Low level. That is, in this state, the readout request signal RREQ is disabled. In this way, when the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. The signal MFULL output from the mask logic 508 is Low level, and the write request signal WREQ is not masked by the mask logic 510. In this state, in response to the write request signal WREQ output from the write controller 201 to the memory access controller 202, the write request signal MWREQ is output from the memory access controller 202 to the memory IF 204. In this way, when the signal FULL is Low level, the write request signal WREQ is enabled. Since the write request signal MWREQ is output from the memory access controller 202 to the memory IF 204 in response to the write request signal WREQ, data are written to the memory addresses corresponding to the divided block 601 used for write operation. Specifically, at this stage, data are written to the memory addresses corresponding to the first divided block 601a used for write operation.

As described above, in the example illustrated in FIG. 6A and FIG. 6B, the way of division of the divided blocks used for write operation and the way of division of the divided blocks used for readout operation are the same as each other. Thus, at the completion of writing of data to the memory addresses corresponding to the first divided block 601a used for write operation, writing of data to all the memory addresses corresponding to the first divided block 602a used for readout operation has been complete. Therefore, after the completion of writing to the memory addresses corresponding to the first divided block 601a used for write operation, an attempt to perform readout from a memory address corresponding to the first divided block 602a used for readout operation does not cause readout from the address in which no image of the current frame has been written. Therefore, after the completion of writing of data to the memory addresses corresponding to the first divided block 601a used for write operation, data are read out from the memory addresses corresponding to the first divided block 602a used for readout operation, as described below.

That is, upon the completion of the writing of data to the memory addresses corresponding to the first divided block 601a used for write operation, the divided-block access completion event WBEND is output. This causes the up-down counter 505 to count up by Un=3, resulting in the count value C=3. Since C+Un=6 and Wn=5, the conditional expression C+Un>Wn in the comparator 506 is satisfied and thus the signal FULL output from the comparator 506 is High level. As described above, the timing when the readout operation completion signal RFIN becomes High level is at the time of completion of readout operation for one frame, for example. Therefore, before the completion of readout operation for one frame, the readout operation completion signal RFIN remains Low level. Thus, when the signal FULL output from the comparator 506 is High level, the signal MFULL output from the mask logic 508 is High level and the write request signal WREQ is masked by the mask logic 510. In this state, even when the write request signal WREQ is output from the write controller 201 to the memory access controller 202, the write request signal MWREQ output from the memory access controller 202 is maintained to be Low level. That is, in this state, the write request signal WREQ is disabled. In this way, when the signal FULL is High level, the write request signal WREQ is disabled. Further, since C−Dn=0 and Rn=0, the conditional expression C−Dn<Rn in the comparator 507 is not satisfied and thus the signal EMPTY output from the comparator 507 is Low level. The signal MEMPTY output from the mask logic 509 is Low level, and the readout request signal RREQ is not masked by the mask logic 511. In this state, in response to the readout request signal RREQ output from the readout controller 203 to the memory access controller 202, the readout request signal MRREQ is output from the memory access controller 202 to the memory IF 204. In this way, when the signal EMPTY is Low level, the readout request signal RREQ is enabled. Since the readout request signal MRREQ is output from the memory access controller 202 to the memory IF 204 in response to the readout request signal RREQ, data are read out from the memory addresses corresponding to the divided block 602 used for readout operation. Specifically, data are read out from memory addresses corresponding to the first divided block 602*a* used for readout operation.

At the completion of readout of data from the memory addresses corresponding to the first divided block 602*a* used for readout operation, no data to be read out is written to the memory addresses corresponding to the second divided block 602*b* used for readout operation. Therefore, after the completion of readout of data from the memory addresses corresponding to the first divided block 602*a* used for readout operation, data are written to the memory addresses corresponding to the second divided block 601*b* used for write operation, as described below. That is, upon the completion of readout of data from the memory addresses corresponding to the first divided block 602*a* used for readout operation, the divided-block access completion event RBEND is issued. This causes the up-down counter 505 to count down by Dn=3, resulting in the count value C=0. Since C−Dn=−3, and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the second divided block 601*b* used for write operation.

As described above, in the example illustrated in FIG. 6A and FIG. 6B, the way of division of the divided blocks used for write operation and the way of division of the divided blocks used for readout operation are the same as each other. Therefore, after the completion of writing to the memory addresses corresponding to the second divided block 601*b* used for write operation, an attempt to perform readout from a memory address corresponding to the second divided block 602*b* used for readout operation does not cause readout from the address in which no current frame image is written. Therefore, after the completion of writing of data to the memory addresses corresponding to the second divided block 601*b* used for write operation, data are read out from the memory addresses corresponding to the second divided block 602*b* used for readout operation.

In the subsequent operation, chase control is sequentially performed in the same manner as described above. The count value C output from the up-down counter 505 changes as illustrated in FIG. 7A. Upon the completion of writing of data to the memory addresses corresponding to the ninth divided block 601*i* used for write operation, the event WVEND indicating the completion of write operation for one frame is output. Further, the write operation completion signal WFIN indicating the completion of write operation for one frame becomes High level. Then, upon the completion of readout of data from the memory addresses corresponding to the ninth divided block 602*i* used for readout operation, the event RVEND indicating the completion of readout operation for one frame is output. Further, the readout operation completion signal RFIN indicating the completion of the readout operation for one frame becomes High level. In this way, in the example of FIG. 6A and FIG. 6B, writing of data to the memory addresses corresponding to the divided block 601 used for write operation and readout of data from the memory addresses corresponding to the divided block 602 used for readout operation are sequentially performed in an alternating manner. As discussed above, according to the present embodiment, chase control can be performed accurately. Upon the completion of readout of one frame of image data by the readout controller 203 and in response to the RFIN from the readout controller 203 turning to a High level, a reset signal is output by the counter 505 and the count value C is set to the initial value.

Figure 6C:
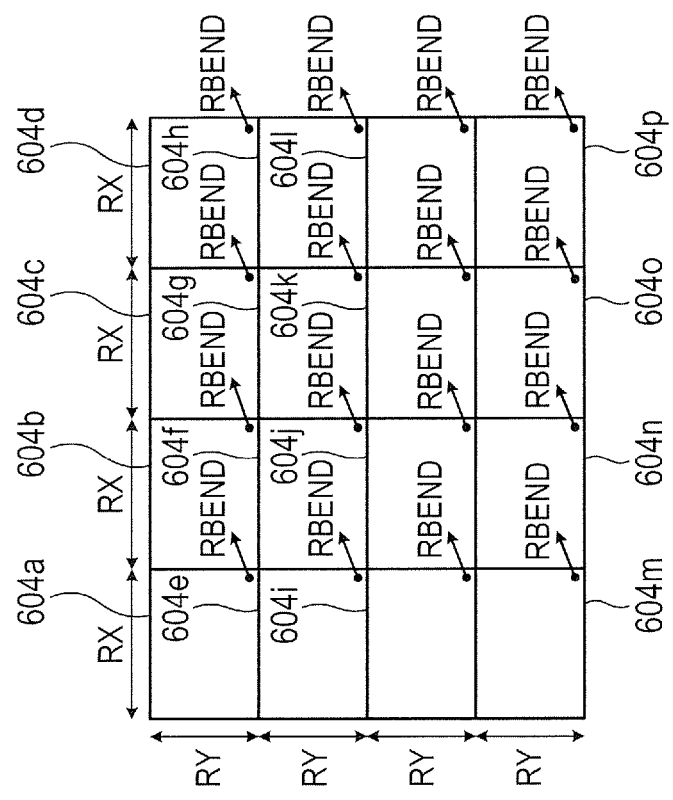
Figure 6D:
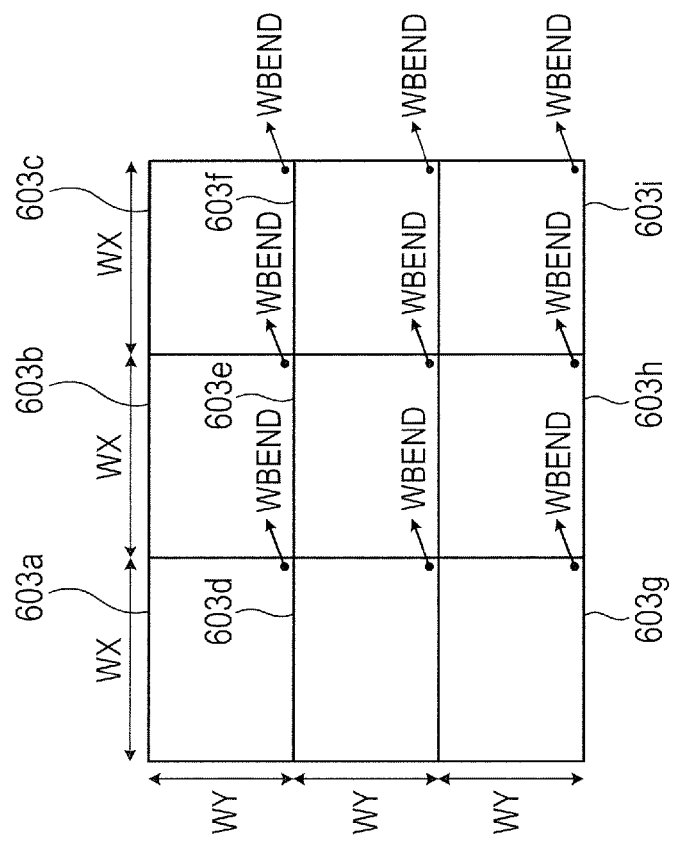

FIG. 6C and FIG. 6D illustrate an example in which the way of division of the blocks used for write operation and the way of division of the blocks used for readout operation are different from each other, which corresponds to a case where different numbers of divisions of blocks and different block sizes are applied to a processor which performs writing of an image and a processor which performs readout of an image in FIG. 1, for example. FIG. 6C illustrates the block division for write operation, and FIG. 6D illustrates the block division for readout operation. In the block division for write operation, each of the number of divisions WXN in the horizontal direction and the number of divisions WYN in the vertical direction is three. On the other hand, in the block division for readout operation, each of the number of divisions RXN in the horizontal direction and the number of divisions RYN in the vertical direction is four. The size WX in the horizontal direction of each of divided blocks 603*a* to 603*i* used for write operation is larger than the size RX in the horizontal direction of each of divided blocks 604*a* to 604*p* used for readout operation. Further, the size WY in the vertical direction of each of the divided blocks 603*a* to 603*i* used for write operation is larger than the size RY in the vertical direction of each of the divided blocks 604*a* to 604*p* used for readout operation. Note that, in the present embodiment, the reference numerals 603*a* to 603*i* and 604*a* to 604*p* will be used when describing an individual divided block, and the reference numerals 603 and 604 will be used when generally describing a divided block. In the example illustrated in FIG. 6C and FIG. 6D, respective parameter values are set as follows. That is, C0=0, Un=4, Dn=3, Wn=6, Rn=0, and Buf=6. FIG. 7B is a time chart illustrating an internal state of the memory access controller 202. FIG. 7B corresponds to a case of the block division as illustrated in FIG. 6C and FIG. 6D.

First, an initial state will be described. In the initial state before writing of one frame of image data is started, the count value C in the up-down counter 505 is set as the initial value C0=0. Since C−Dn=−3 and Rn=0, the conditional expression C−Dn<Rn in the comparator 507 is satisfied and thus a signal EMPTY output from the comparator 507 is High level. Since the signal EMPTY is High level, the readout request signal RREQ is disabled. Further, since C+Un=4 and Wn=6, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the first divided block 603*a* used for write operation.

As described above, in the example illustrated in FIG. 6C and FIG. 6D, the size of each divided block 604 used for readout operation is smaller than the size of each divided block 603 used for write operation in both the horizontal direction and the vertical direction. Therefore, after the completion of writing to the memory addresses corresponding to the first divided block 603a used for write operation, an attempt to perform readout from a memory address corresponding to the first divided block 604a used for readout operation does not cause readout from the address in which no current frame image is written. Therefore, after the completion of writing of data to the memory addresses corresponding to the first divided block 603a used for write operation, data are read out from the memory addresses corresponding to the first divided block 604a used for readout operation, as described below. That is, upon the completion of writing of data to the memory addresses corresponding to the first divided block 603a used for write operation, the divided-block access completion event WBEND is output. This causes the up-down counter 505 to count up by Un=4, resulting in the count value C=4. Since C+Un=8 and Wn=6, the conditional expression C+Un>Wn in the comparator 506 is satisfied and thus the signal FULL output from the comparator 506 is High level. Since the signal FULL is High level, the write request signal WREQ is disabled. Further, since C−Dn=1 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Therefore, data are read out from the memory addresses corresponding to the first divided block 604a used for readout operation.

At the completion of readout of data from the memory addresses corresponding to the first divided block 604a used for readout operation, writing of data has not been completed to all of the memory addresses corresponding to the second divided block 604b used for readout operation. Therefore, after the completion of readout of data from the memory addresses corresponding to the first divided block 604a used for readout operation, data are written to the memory addresses corresponding to the second divided block 603b used for write operation, as described below. That is, upon the completion of readout of data from the memory addresses corresponding to the first divided block 604a used for readout operation, the divided-block access completion event RBEND is output. This causes the up-down counter 505 to count down by Dn=3, resulting in the count value C=1. Since C−Dn=−2 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=5 and Wn=6, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the second divided block 603b used for write operation.

As described above, in the example illustrated in FIG. 6C and FIG. 6D, the size of each divided block 604 used for readout operation is smaller than the size of each divided block 603 used for write operation in both the horizontal direction and the vertical direction. Therefore, after the completion of writing to the memory addresses corresponding to the second divided block 603b used for write operation, an attempt to perform readout from the memory addresses corresponding to the second divided block 604b used for readout operation does not cause readout from the address in which no current frame image is written. Therefore, after the completion of writing of data to the memory addresses corresponding to the second divided block 603b used for write operation, data are read out from the memory addresses corresponding to the second divided block 604b used for readout operation, as described below. That is, upon the completion of writing of data to the memory addresses corresponding to the second divided block 603b used for write operation, the divided-block access completion event WBEND is output. This causes the up-down counter 505 to count up by Un=4, resulting in the count value C=5. Since C+Un=9 and Wn=6, the conditional expression C+Un>Wn in the comparator 506 is satisfied and thus the signal FULL output from the comparator 506 is High level. Since the signal FULL is High level, the write request signal WREQ is disabled. Further, since C−Dn=2 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Therefore, data are read out from the memory addresses corresponding to the second divided block 604b used for readout operation.

At the completion of readout of data from the memory addresses corresponding to the second divided block 604b used for readout operation, writing of data has not been completed to all of the memory addresses corresponding to the third divided block 604c used for readout operation. Therefore, after the completion of readout of data from the memory addresses corresponding to the second divided block 604b used for readout operation, data are written to the memory addresses corresponding to the third divided block 603c used for write operation, as described below. That is, upon the completion of readout of data from the memory addresses corresponding to the second divided block 604b used for readout operation, the divided-block access completion event RBEND is output. This causes the up-down counter 505 to count down by Dn=3, resulting in the count value C=2. Since C−Dn=−1 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=6 and Wn=6, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the third divided block 603c used for write operation.

As described above, in the example illustrated in FIG. 6C and FIG. 6D, the size of each divided block 604 used for readout operation is smaller than the size of each divided block 603 used for write operation in both the horizontal direction and the vertical direction. Therefore, after the completion of writing to the memory addresses corresponding to the third divided block 603c used for write operation, an attempt to perform readout from a memory addresses corresponding to the third divided block 604c used for readout operation does not cause readout from the address in which no current frame image is written. Therefore, after the completion of writing of data to the memory addresses corresponding to the third divided block 603c used for write operation, data are read out from the memory addresses corresponding to the third divided block 604c used for readout operation, as described below. That is, upon the completion of writing of data to the memory addresses corresponding to the third divided block 603c used for write operation, the divided-block access completion event WBEND is output. This causes the up-down counter 505 to count up by Un=4, resulting in the count value C=6. Since C−Dn=3 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=10 and Wn=6, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the third divided block 604c used for readout operation.

At the completion of readout of data from the memory addresses corresponding to the third divided block 604c used for readout operation, the current frame data to be read out are written to the memory addresses corresponding to the fourth divided block 604d used for readout operation. Therefore, after the completion of readout of data from the memory addresses corresponding to the third divided block 604c used for readout operation, data are read out from the memory addresses corresponding to the fourth divided block 604d used for readout operation, as described below. That is, upon the completion of readout of data from the memory addresses corresponding to the third divided block 604c used for readout operation, the divided-block access completion event RBEND is output. This causes the up-down counter 505 to count down by Dn=3, resulting in the count value C=3. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=7 and Wn=6, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the fourth divided block 604d used for readout operation.

At the completion of readout of data from the memory addresses corresponding to the fourth divided block 604d used for readout operation, writing of data has not been completed to all of the memory addresses corresponding to the fifth divided block 604e used for readout operation. Therefore, after the completion of readout of data from the memory addresses corresponding to the fourth divided block 604d used for readout operation, data are written to the memory addresses corresponding to the fourth divided block 603d used for write operation, as described below. That is, upon the completion of readout of data from the memory addresses corresponding to the fourth divided block 604d used for readout operation, the divided-block access completion event RBEND is output. This causes the up-down counter 505 to count down by Dn=3, resulting in the count value C=0. Since C−Dn=−3 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=4 and Wn=6, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the fourth divided block 603d used for write operation.

In the subsequent operation, chase control is sequentially performed in the same manner as described above. The count value C output from the up-down counter 505 changes as illustrated in FIG. 7B. Upon the completion of writing of data to the memory addresses corresponding to the ninth divided block 603i used for write operation, the event WVEND indicating the completion of write operation for one frame is output. Further, the write operation completion signal WFIN indicating the completion of write operation for one frame becomes High level. At the completion of writing to the memory addresses corresponding to the ninth divided block 603i used for write operation, readout from the memory addresses corresponding to the 11th to 16th divided blocks 604k to 604p used for readout operation has not been completed. After the completion of writing to the memory addresses corresponding to the ninth divided block 603i used for write operation, readout from the memory addresses corresponding to the 11th to 16th divided blocks 604k to 604p used for readout operation is sequentially performed. Upon the completion of readout of data from the memory addresses corresponding to the 16th divided block 604p used for readout operation, the event RVEND indicating the completion of readout operation for one frame is output. As discussed above, according to the present embodiment, chase control can be accurately performed also in the case of the block division as illustrated in FIG. 6C and FIG. 6D.

Figure 6F:
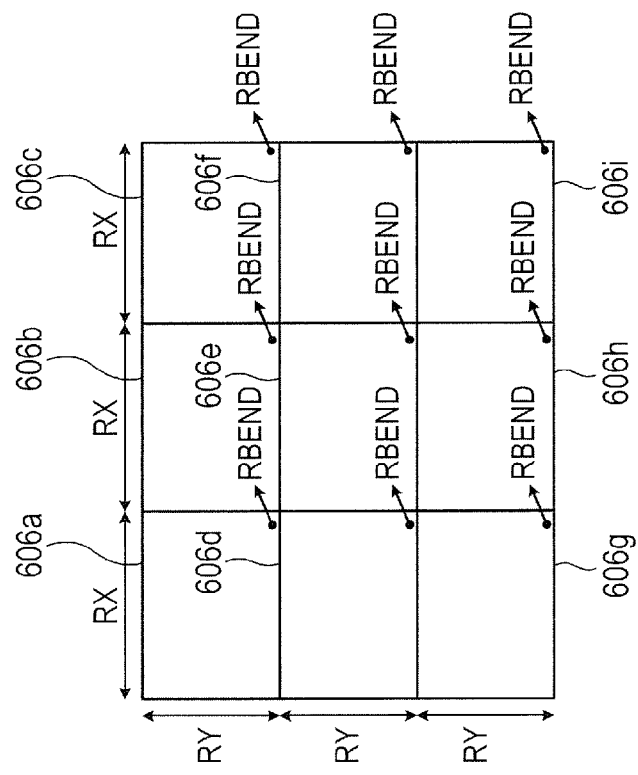
Figure 6E:
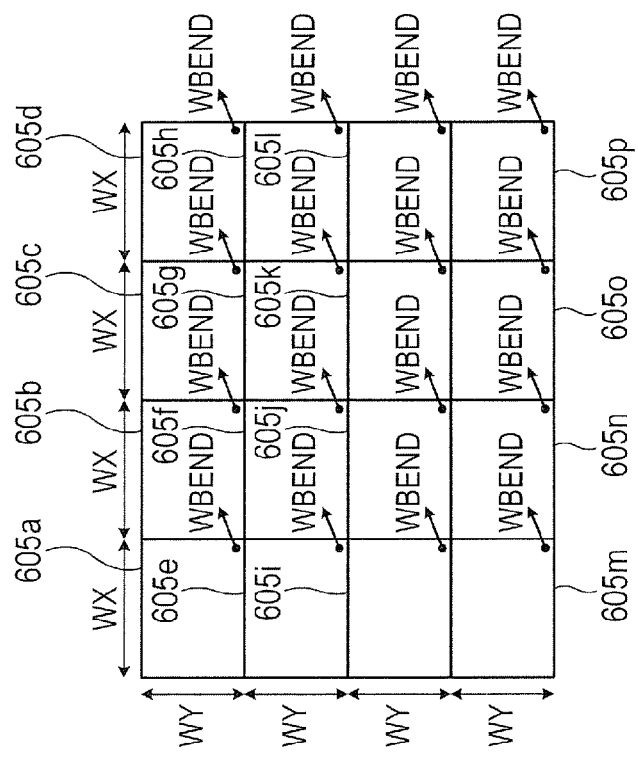

FIG. 6E and FIG. 6F illustrate an example in which the way of division of the blocks used for write operation and the way of division of the blocks used for readout operation are different from each other, which corresponds to a case where the different numbers of divisions of blocks and different block sizes are applied to a processor which performs writing of an image and a processor which performs readout of an image in FIG. 1, for example. FIG. 6E illustrates the block division for write operation, and FIG. 6F illustrates the block division for readout operation. In the block division for write operation, each of the number of divisions WXN in the horizontal direction and the number of divisions WYN in the vertical direction is four. On the other hand, in the block division for readout operation, each of the number of divisions RXN in the horizontal direction and the number of divisions RYN in the vertical direction is three. The size WX in the horizontal direction of each of the divided blocks 605a to 605p used for write operation is smaller than the size RX in the horizontal direction of each of divided blocks 606a to 606i used for readout operation. Further, the size WY in the vertical direction of each of the divided blocks 605a to 605p used for write operation is smaller than the size RY in the vertical direction of each of the divided blocks 606a to 606i used for readout operation. Note that, in the present specification, the reference numerals 605a to 605p and 606a to 606i will be used when describing an individual divided block, and the reference numerals 605 and 606 will be used when generally describing a divided block. In the example illustrated in FIG. 6E and FIG. 6F, respective parameter values are set as follows. That is, C0=0, Un=3, Dn=4, Wn=18, Rn=12, and Buf=6. FIG. 7C is a time chart illustrating an internal state of the memory access controller 202. FIG. 7C corresponds to a case of the block division as illustrated in FIG. 6E and FIG. 6F.

First, an initial state will be described. In the initial state, the count value of the up-down counter 505 is set as the initial value C0=0. Since C−Dn=−4 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the first divided block 605a used for write operation.

As described above, in the example illustrated in FIG. 6E and FIG. 6F, the size of each divided block 606 used for readout operation is larger than the size of each divided block 605 used for write operation in both the horizontal direction and the vertical direction. At the completion of writing of data to the memory addresses corresponding to the first divided block 605a used for write operation, writing of data has not been completed to all of the memory addresses corresponding to first divided block 606a used for readout operation. Thus, at the completion of writing of data to the memory addresses corresponding to the first divided block 605a used for write operation, no readout of data from the memory addresses corresponding to the first divided block 606a used for readout operation is performed. After the completion of writing of data to the memory addresses corresponding to the first divided block 605a used for write operation, data are written to the memory addresses corresponding to the second divided block 605b used for write operation, as described below. That is, upon the completion of writing of data to the memory addresses corresponding to the first divided block 605a used for write operation, the divided-block access completion event WBEND is output. This causes the up-down counter 505 to count up by Un=3, resulting in the count value C=3. Since C−Dn=−1 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=6 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are read out from the memory addresses corresponding to the second divided block 605b used for write operation.

As described above, in the example illustrated in FIG. 6E and FIG. 6F, the size of each divided block 606 used for readout operation is larger than the size of each divided block 605 used for write operation in both the horizontal direction and the vertical direction. At the completion of writing of data to the memory addresses corresponding to the second divided block 605b used for write operation, writing of data has not been completed to all of the memory addresses corresponding to first divided block 606a used for readout operation. Thus, at the completion of writing of data to the memory addresses corresponding to the second divided block 605b used for write operation, no readout of data from the memory addresses corresponding to the first divided block 606a used for readout operation is performed. After the completion of writing of data to the memory addresses corresponding to the second divided block 605b used for write operation, data are written to the memory addresses corresponding to the third divided block 605c used for write operation, as described below. That is, upon the completion of writing of data to the memory addresses corresponding to the second divided block 605b used for write operation, the divided-block access completion event WBEND is output. This causes the up-down counter 505 to count up by Un=3, resulting in the count value C=6. Since C−Dn=2 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=9 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the third divided block 605c used for write operation.

At the completion of writing of data to the memory addresses corresponding to the third divided block 605c used for write operation, writing of data has not been completed to all of the memory addresses corresponding to the first divided block 606a used for readout operation. Therefore, at the completion of writing of data to the memory addresses corresponding to the third divided block 605c used for write operation, no readout of data from the memory addresses corresponding to the first divided block 606a used for readout operation is performed. After the completion of writing of data to the memory addresses corresponding to the third divided block 605c used for write operation, data are written to the memory addresses corresponding to the fourth divided block 605d used for write operation, as described below. That is, upon the completion of wiring of data to the memory addresses corresponding to the third divided block 605c used for write operation, the divided-block access completion event WBEND is output. This causes the up-down counter 505 to count up by Un=3, resulting in the count value C=9. Since C−Dn=5 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=12 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written in the memory addresses corresponding to the fourth divided block 605d used for write operation.

At the completion of writing of data to the memory addresses corresponding to the fourth divided block 605d used for write operation, writing of data has not been completed to all of the memory addresses corresponding to the first divided block 606a used for readout operation. Thus, at the completion of writing of data to the memory addresses corresponding to the fourth divided block 605d used for write operation, no readout of data from the memory addresses corresponding to the first divided block 606a used for readout operation is performed. After the completion of writing of data to the memory addresses corresponding to the fourth divided block 605d used for write operation, data are written to the memory addresses corresponding to the fifth divided block 605e used for write operation, as described below. That is, upon the completion of wiring of data to the memory addresses corresponding to the fourth divided block 605d used for write operation, the divided-block access completion event WBEND is output.

This causes the up-down counter 505 to count up by Un=3, resulting in the count value C=12. Since C−Dn=8 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=15 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the fifth divided block 605e used for write operation.

At the completion of writing of data to the memory addresses corresponding to the fifth divided block 605e used for write operation, writing of data has not been completed to all of the memory addresses corresponding to the first divided block 606a used for readout operation. Thus, at the completion of writing of data to the memory addresses corresponding to the fifth divided block 605e used for write operation, no readout of data from the memory addresses corresponding to the first divided block 606a used for readout operation is performed. After the completion of writing of data to the memory addresses corresponding to the fifth divided block 605e used for write operation, data are written to the memory addresses corresponding to the sixth divided block 605f used for write operation, as described below. That is, upon the completion of wiring of data to the memory addresses corresponding to the fifth divided block 605e used for write operation, the divided-block access completion event WBEND is output. This causes the up-down counter 505 to count up by Un=3, resulting in the count value C=15. Since C−Dn=11 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=18 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the sixth divided block 605f used for write operation.

At the completion of writing of data to the memory addresses corresponding to the sixth divided block 605f used for write operation, writing of data has been completed to all of the memory addresses corresponding to the first divided block 606a used for readout operation. Thus, after the completion of writing of data to the memory addresses corresponding to the sixth divided block 605f used for write operation, data are read out from the memory addresses corresponding to the first divided block 606a used for readout operation, as described below. That is, upon the completion of wiring of data to the memory addresses corresponding to the sixth divided block 605f used for write operation, the divided-block access completion event WBEND is output. This causes the up-down counter 505 to count up by Un=3, resulting in the count value C=18. Since C−Dn=14 and Rn=12, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=21 and Wn=18, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the first divided block 606a used for readout operation.

At the completion of readout of data from the memory addresses corresponding to the first divided block 606a used for readout operation, writing of data has not been completed to all of the memory addresses corresponding to the second divided block 606b used for readout operation. Therefore, after the completion of readout of data from the memory addresses corresponding to the first divided block 606a used for readout operation, data are written to the memory addresses corresponding to the seventh divided block 605g used for write operation, as described below. That is, upon the completion of readout of data from the memory addresses corresponding to the first divided block 606a used for readout operation, the divided-block access completion event RBEND is output. This causes the up-down counter 505 to count down by Dn=4, resulting in the count value C=14. Since C−Dn=10 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=17 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the seventh divided block 605g used for write operation.

At the completion of writing of data to the memory addresses corresponding to the seventh divided block 605g used for write operation, writing of data to all the memory addresses corresponding to the second divided block 606b used for readout operation has been completed. Thus, after the completion of writing of data to the memory addresses corresponding to the seventh divided block 605g used for write operation, data are read out from the memory addresses corresponding to the second divided block 606b used for readout operation, as described below. That is, upon the completion of writing of data to the memory addresses corresponding to the seventh divided block 605g used for write operation, the divided-block access completion event WBENT is output. This causes the up-down counter 505 to count up by Un=3, resulting in count value C=17. Since C−Dn=13 and Rn=12, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=20 and Wn=18, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the second divided block 606b used for readout operation.

At the completion of readout of data from the memory addresses corresponding to the second divided block 606b used for readout operation, writing of data has not been completed to all of the memory addresses corresponding to the third divided block 606c used for readout operation. Therefore, after the completion of readout of data from the memory addresses corresponding to the second divided block 606b used for readout operation, data are written to the memory addresses corresponding to the eighth divided block 605h used for write operation, as described below. That is, upon the completion of readout of data from the memory addresses corresponding to the second divided block 606*b* used for readout operation, the divided-block access completion event RBEND is output. This causes the up-down counter 505 to count down by Dn=4, resulting in the count value C=13. Since C−Dn=9 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=16 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the eighth divided block 605*h* used for write operation.

At the completion of writing of data to the memory addresses corresponding to the eighth divided block 605*h* used for write operation, writing of data to all the memory addresses corresponding to the third divided block 606*c* used for readout operation has been completed. Thus, after the completion of writing of data to the memory addresses corresponding to the eighth divided block 605*h* used for write operation, data are read out from the memory addresses corresponding to the third divided block 606*c* used for readout operation, as described below. That is, upon the completion of writing of data to the memory addresses corresponding to the eighth divided block 605*h* used for write operation, the divided-block access completion event WBENT is output. This causes the up-down counter 505 to count up by Un=3, resulting in count value C=16. Since C−Dn=12 and Rn=12, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=19 and Wn=18, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the third divided block 606*c* used for readout operation.

At the completion of readout of data from the memory addresses corresponding to the third divided block 606*c* used for readout operation, writing of data has not been completed to all of the memory addresses corresponding to the fourth divided block 606*d* used for readout operation. Therefore, after the completion of readout of data from the memory addresses corresponding to the third divided block 606*c* used for readout operation, data are written to the memory addresses corresponding to the ninth divided block 605*i* used for write operation, as described below. That is, upon the completion of readout of data from the memory addresses corresponding to the third divided block 606*c* used for readout operation, the divided-block access completion event RBEND is output. This causes the up-down counter 505 to count down by Dn=4, resulting in the count value C=12. Since C−Dn=8 and Rn=12, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=15 and Wn=18, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the ninth divided block 605*i* used for write operation.

In the subsequent operation, chase control is sequentially performed in the same manner as described above. The count value C output from the up-down counter 505 changes as illustrated in FIG. 7C. Upon the completion of writing of data to the memory addresses corresponding to the 16th divided block 605*p* used for write operation, the event WVEND indicating the completion of write operation for one frame is output. Further, the write operation completion signal WFIN indicating the completion of write operation for one frame becomes High level. Upon the completion of readout of data from the memory addresses corresponding to the ninth divided block 606*i* used for readout operation, the event RVEND indicating the completion of readout operation for one frame is output. Further, the readout operation completion signal RFIN indicating the completion of readout operation for one frame becomes High level. As discussed above, according to the present embodiment, chase control can be accurately performed also in the case of the block division as illustrated in FIG. 6E and FIG. 6F.

Figure 8A:
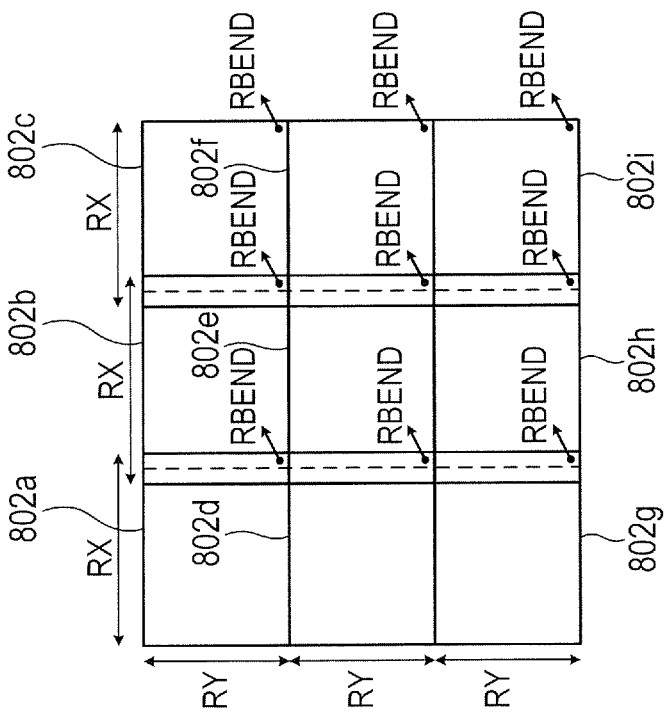
FIG. 8A, FIG. 8B, FIG. 8C, and FIG. 8D are diagrams conceptually illustrating examples of block division.
Figure 8B:
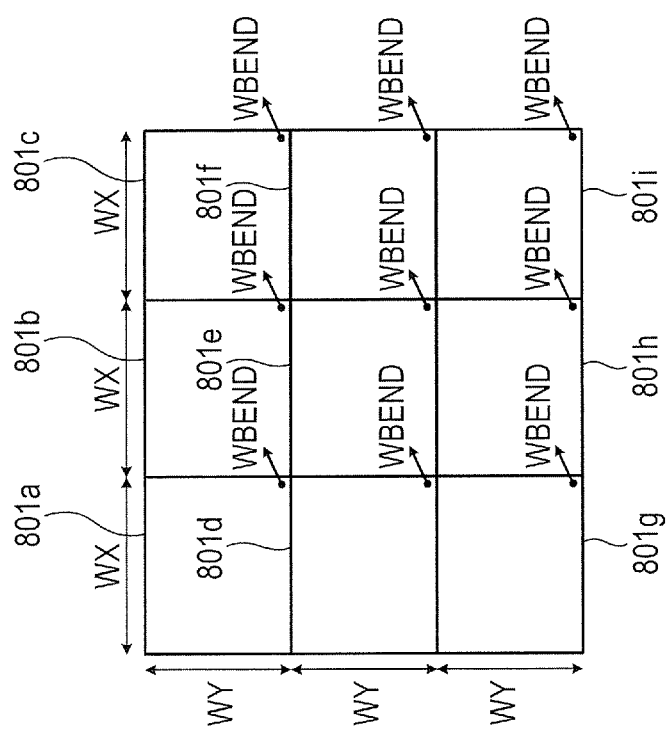

FIG. 8A to FIG. 8D are diagrams conceptually illustrate examples of block division. FIG. 8A and FIG. 8B illustrate an example in which divided blocks used for readout operation are set so as to be overlapped in the horizontal direction. FIG. 8A illustrates block division for write operation, and FIG. 8B illustrates block division for readout operation. In both the block division for write operation and the block division for readout operation, each number of divisions WXN and RXN in the horizontal direction is three, and each number of divisions WYN and RYN in the vertical direction is three. The size RX in the horizontal direction of each of divided blocks 802*a* to 802*i* used for readout operation is larger than the size WX in the horizontal direction of each of divided blocks 801*a* to 801*i* used for write operation. The right side portions of the divided blocks 802*a*, 802*d*, and 802*g* used for readout operation overlap with the left side portions of the divided blocks 802*b*, 802*e*, and 802*h* used for readout operation, respectively. The right side portions of the divided blocks 802*b*, 802*e*, and 802*h* used for readout operation overlap with the left side portions of the divided blocks 802*c*, 802*f*, and 802*i* used for readout operation, respectively. The size RY in the vertical direction of each of the divided blocks 802*a* to 802*i* used for readout operation and the size RY in the vertical direction of each of the divided blocks 801*a* to 801*i* used for write operation are equal to each other. Note that, in the present specification, the reference numerals 801*a* to 801*i* and 802*a* to 802*i* will be used when describing an individual divided block, and the reference numerals 801 and 802 will be used when generally describing a divided block. In the example illustrated in FIG. 8A and FIG. 8B, respective parameter values are set as follows. That is, C0=−3, Un=3, Dn=3, Wn=5, Rn=0, and Buf=5. Note that the reason why C0 is set to −3 is that the size in the horizontal direction of the divided block 802 used for readout operation is larger than the size in the horizontal direction of the divided block 801 used for write operation and it is therefore necessary to delay readout operation. In the example of FIG. 8A and FIG. 8B, readout operation may be delayed for the time corresponding to one time of write operation. The count-up value corresponding to one time of write operation is given as Un=RXN=3. Thus, C0=−3 is applied in this example. FIG. 9 is a time chart illustrating an internal state of the memory access controller 202. FIG. 9 corresponds to a case of the block division as illustrated in FIG. 8A and FIG. 8B.

First, an initial state will be described. In the initial state, the count value of the up-down counter 505 is set as the initial value C0=−3. Since C−Dn=−6 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=0 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the first divided block 801a used for write operation.

As described above, in the example illustrated in FIG. 8A and FIG. 8B, the size of each divided block 802 used for readout operation is larger than the size of each divided block 801 used for write operation in the horizontal direction. At the completion of writing of data to the memory addresses corresponding to the first divided block 801a used for write operation, writing of data has not been completed to all of the memory addresses corresponding to the first divided block 802a used for readout operation. Thus, at the completion of writing of data to the memory addresses corresponding to the first divided block 801a used for write operation, no readout of data from the memory addresses corresponding to the first divided block 802a used for readout operation is performed. After the completion of writing of data to the memory addresses corresponding to the first divided block 801a used for write operation, data are written to the memory addresses corresponding to the second divided block 801b used for write operation, as described below. That is, upon the completion of writing of data to the memory addresses corresponding to the first divided block 801a used for write operation, the divided-block access completion event WBEND is output. This causes the up-down counter 505 to count up by Un=3, resulting in the count value C=0. Since C−Dn=−3 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the second divided block 801b used for write operation.

At the completion of writing of data to the memory addresses corresponding to the second divided block 801b used for write operation, writing of data to all the memory addresses corresponding to the first divided block 802a used for readout operation has been completed. Therefore, after the completion of writing of data to the memory addresses corresponding to the second divided block 801b used for write operation, data are read out from the memory addresses corresponding to the first divided block 802a used for readout operation, as described below. That is, upon the completion of writing of data to the memory addresses corresponding to the second divided block 801b used for write operation, the divided-block access completion event WBEND is output. This causes the up-down counter 505 to count up by Un=3, resulting in the count value C=3. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=6 and Wn=5, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the first divided block 802a used for readout operation.

At the completion of readout of data from the memory addresses corresponding to the first divided block 802a used for readout operation, writing of data has not been completed to all of the memory addresses corresponding to the second divided block 802b used for readout operation. Thus, at the completion of readout of data from the memory addresses corresponding to the first divided block 802a used for readout operation, no readout of data from the memory addresses corresponding to the second divided block 802b used for readout operation is performed. After the completion of readout of data from the memory addresses corresponding to the first divided block 802a used for readout operation, data are written to the memory addresses corresponding to the third divided block 801c used for write operation, as described below. That is, upon the completion of writing of data to the memory addresses corresponding to the first divided block 802a used for readout operation, the divided-block access completion event RBEND is output. This causes the up-down counter 505 to count down by Dn=3, resulting in the count value C=0. Since C−Dn=−3 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the third divided block 801c used for write operation.

In the subsequent operation, chase control is sequentially performed in the same manner as described above. The count value C output from the up-down counter 505 changes as illustrated in FIG. 9. Upon the completion of writing of data to the memory addresses corresponding to the ninth divided block 801i used for write operation, the event WVEND indicating the completion of write operation for one frame is output. Further, the write operation completion signal WFIN indicating the completion of write operation for one frame becomes High level. Then, upon the completion of readout of data from the memory addresses corresponding to the ninth divided block 802i used for readout operation, the event RVEND indicating the completion of readout operation for one frame is output. Further, the readout operation completion signal RFIN indicating the completion of readout operation for one frame becomes High level. As discussed above, chase control can be accurately performed also in the case of the block division as illustrated in FIG. 8A and FIG. 8B.

Figure 8D:
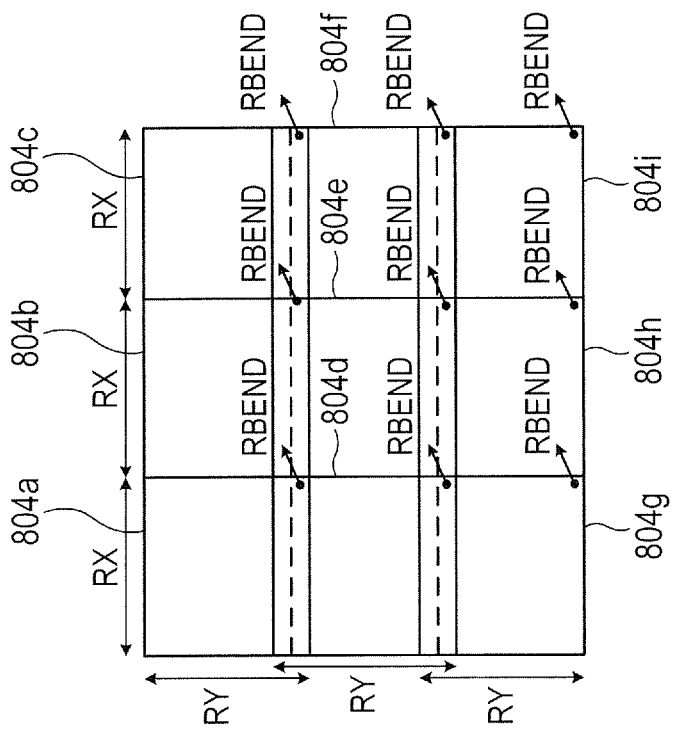
Figure 8C:
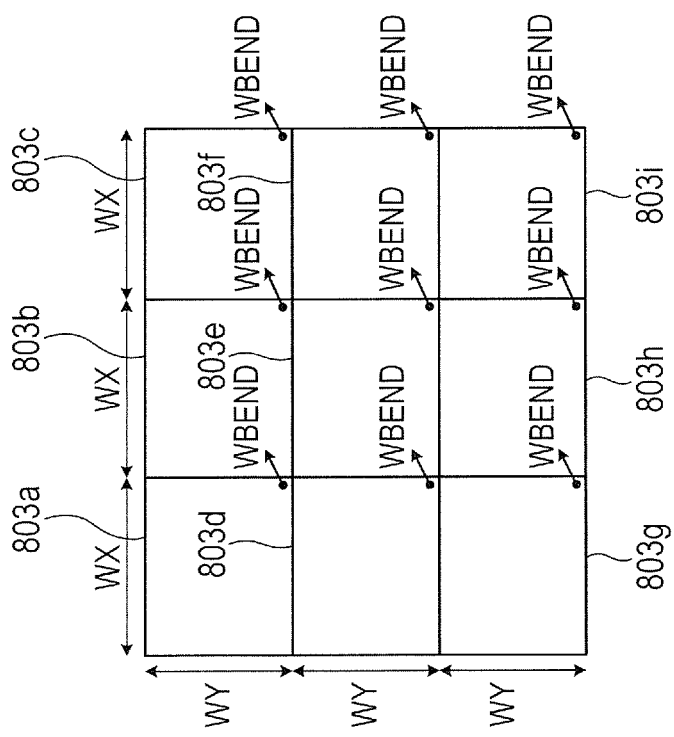
Figure 9:
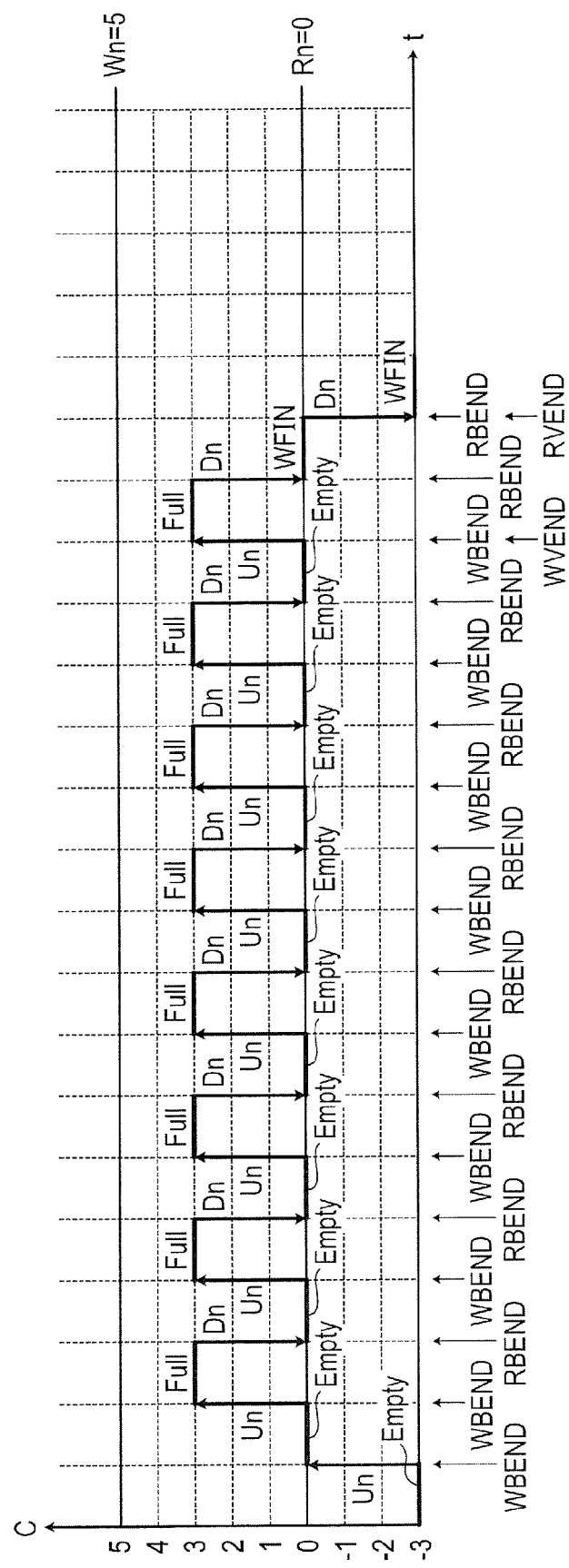
FIG. 9 is a time chart illustrating an internal state of the memory access controller.
Figure 10:
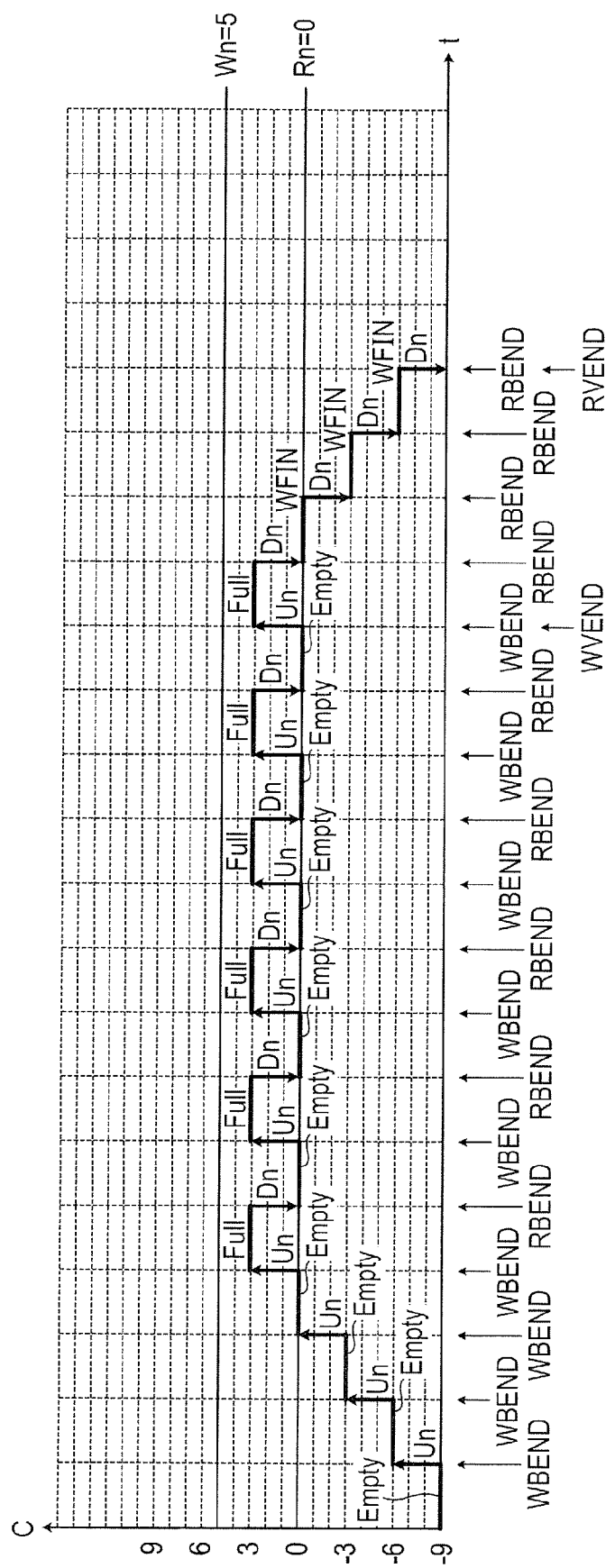
FIG. 10 is a time chart illustrating an internal state of the memory access controller.

FIG. 8C and FIG. 8D illustrate an example in which divided blocks used for readout operation are set so as to be overlapped in the vertical direction. FIG. 8C illustrates block division for write operation, and FIG. 8D illustrates block division for readout operation. In both the block division for write operation and the block division for readout operation, each number of divisions WXN and RXN in the horizontal direction is three, and each number of divisions WYN and RYN in the vertical direction is three. The size RX in the horizontal direction of each of divided blocks 804a to 804i used for readout operation and the size in the horizontal direction of each of divided blocks 803a to 803i used for write operation are equal to each other. The size RY in the vertical direction of each of the divided blocks 804a to 804i used for readout operation is larger than the size RY in the vertical direction of each of the divided blocks 803a to 803i used for write operation. The lower side portions of the divided blocks 804a to 804c used for readout operation overlap with the upper side portions of the divided blocks 804d to 804f used for readout operation, respectively. The lower side portions of the divided blocks 804d to 804f used for readout operation overlap with the upper side portions of the divided blocks 804g to 804i used for readout operation, respectively. Note that, in the present specification, the reference numerals 803a to 803i and 804a to 804i will be used when describing an individual divided block, and the reference numerals 803 and 804 will be used when generally describing a divided block. In the example illustrated in FIG. 8C and FIG. 8D, respective parameter values are set as follows. That is, C0=−9, Un=3, Dn=3, Wn=5, Rn=0, and Buf=5. Note that the reason why C0 is set to −9 is that the size in the vertical direction of the divided block 804 used for readout operation is larger than the size in the vertical direction of the divided block 803 used for write operation and it is therefore necessary to delay readout operation. In the example of FIG. 8C and FIG. 8D, readout operation may be delayed for three times of write operation. The count-up value corresponding to three times of write operation is given as Un×3=RXN×3=9. Thus, C0=−9 is applied in this example. FIG. 10 is a time chart illustrating an internal state of the memory access controller 202. FIG. 10 corresponds to a case of the block division as illustrated in FIG. 8C and FIG. 8D.

First, an initial state will be described. In the initial state, the count value C of the up-down counter 505 is set as the initial value C0=−9. Since C−Dn=−12 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=−6 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the first divided block 803a used for write operation.

As described above, in the example illustrated in FIG. 8C and FIG. 8D, the size of each divided block 804 used for readout operation is larger than the size of each divided block 803 used for write operation in the vertical direction. At the completion of writing of data to the memory addresses corresponding to the first divided block 803a used for write operation, writing of data has not been completed to all of the memory addresses corresponding to the first divided block 804a used for readout operation. Thus, at the completion of writing of data to the memory addresses corresponding to the first divided block 803a used for write operation, no readout of data from the memory addresses corresponding to the first divided block 804a used for readout operation is performed. After the completion of writing of data to the memory addresses corresponding to the first divided block 803a used for write operation, data are written to the memory addresses corresponding to the second divided block 803b used for write operation, as described below. That is, upon the completion of writing of data to the memory addresses corresponding to the first divided block 803a used for write operation, the divided-block access completion event WBEND is output. This causes the up-down counter 505 to count up by Un=3, resulting in the count value C=−6. Since C−Dn=−9 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=−3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the second divided block 803b used for write operation.

At the completion of writing of data to the memory addresses corresponding to the second divided block 803b used for write operation, writing of data has not been completed to all of the memory addresses corresponding to the first divided block 804a used for readout operation. Thus, at the completion of writing of data to the memory addresses corresponding to the second divided block 803a used for write operation, no readout of data from the memory addresses corresponding to the first divided block 804a used for readout operation is performed. After the completion of writing of data to the memory addresses corresponding to the second divided block 803b used for write operation, data are written to the memory addresses corresponding to the third divided block 803c used for write operation, as described below. That is, upon the completion of writing of data to the memory addresses corresponding to the second divided block 803b used for write operation, the divided-block access completion event WBEND is output. This causes the up-down counter 505 to count up by Un=3, resulting in the count value C=−3. Since C−Dn=−6 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=0 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the third divided block 803c used for write operation.

At the completion of writing of data to the memory addresses corresponding to the third divided block 803c used for write operation, writing of data has not been completed to all of the memory addresses corresponding to the first divided block 804a used for readout operation. Thus, at the completion of writing of data to the memory addresses corresponding to the third divided block 803c used for write operation, no readout of data from the memory addresses corresponding to the first divided block 804a used for readout operation is performed. After the completion of writing of data to the memory addresses corresponding to the third divided block 803c used for write operation, data are written to the memory addresses corresponding to the fourth divided block 803d used for write operation, as described below. That is, upon the completion of writing of data to the memory addresses corresponding to the third divided block 803c used for write operation, the divided-block access completion event WBEND is output. This causes the up-down counter 505 to count up by Un=3, resulting in the count value C=0. Since C−Dn=−3 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the fourth divided block 803d used for write operation.

At the completion of writing of data to the memory addresses corresponding to the fourth divided block 803d used for write operation, writing of data to all the memory addresses corresponding to the first divided block 804a used for readout operation has been completed. Thus, after the completion of writing of data to the memory addresses corresponding to the fourth divided block 803d used for write operation, data are read out from the memory addresses corresponding to the first divided block 804a used for readout operation, as described below. That is, upon the completion of writing of data to the memory addresses corresponding to the fourth divided block 803d used for write operation, the divided-block access completion event WBEND is output. This causes the up-down counter 505 to count up by Un=3, resulting in the count value C=3. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Further, since C+Un=6 and Wn=5, the conditional expression C+Un>Wn in the comparator 506 is satisfied and thus the signal FULL output from the comparator 506 is High level. Since the signal FULL is High level, the write request signal WREQ is disabled. Therefore, data are read out from the memory addresses corresponding to the first divided block 804a used for readout operation.

At the completion of readout of data from the memory addresses corresponding to the first divided block 804a used for readout operation, writing of data has not been completed to all of the memory addresses corresponding to the second divided block 804b used for readout operation. Thus, at the completion of readout of data from the memory addresses corresponding to the first divided block 804a used for readout operation, no readout of data from the memory addresses corresponding to the second divided block 804b used for readout operation is performed. After the completion of readout of data from the memory addresses corresponding to the first divided block 804a used for readout operation, data are written to the memory addresses corresponding to the fifth divided block 803e used for write operation, as described below. That is, upon the completion of readout of data from the memory addresses corresponding to the first divided block 804a used for readout operation, the divided-block access completion event RBEND is output. This causes the up-down counter 505 to count down by Dn=3, resulting in the count value C=0. Since C−Dn=−3 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=3 and Wn=5, the conditional expression C+Un>Wn in the comparator 506 is not satisfied and thus the signal FULL output from the comparator 506 is Low level. Since the signal FULL is Low level, the write request signal WREQ is enabled. Therefore, data are written to the memory addresses corresponding to the fifth divided block 803e used for write operation.

In the subsequent operation, chase control is sequentially performed in the same manner as described above. The count value C output from the up-down counter 505 changes as illustrated in FIG. 10. Upon the completion of writing of data to the memory addresses corresponding to the ninth divided block 803i used for write operation, the event WVEND indicating the completion of write operation for one frame is output. Further, the write operation completion signal WFIN indicating the completion of write operation for one frame becomes High level. Then, upon the completion of readout of data from the memory addresses corresponding to the ninth divided block 804i used for readout operation, the event RVEND indicating the completion of readout operation for one frame is output. Further, the readout operation completion signal RFIN indicating the completion of readout operation for one frame becomes High level. As discussed above, according to the present embodiment, chase control can be accurately performed also in the case of the block division as illustrated in FIG. 8C and FIG. 8D.

Note that, while the case where the parameters C0, Un, Dn, Wn, Rn, and Buf of chase control are set to the above-described values has been exemplified, the embodiment is not limited thereto.

As discussed above, according to the present embodiment, a first event is issued every time write operation at a predetermined block is completed, and a second event is issued every time readout operation at a predetermined block is completed. The up-down counter counts up or counts down based on the first event and/or the second event and selectively performs readout operation or write operation based on the count value of the up-down counter. Therefore, according to the present embodiment, an image processing apparatus that can accurately perform readout operation and write operation can be provided.

Second Embodiment

Figure 11A:
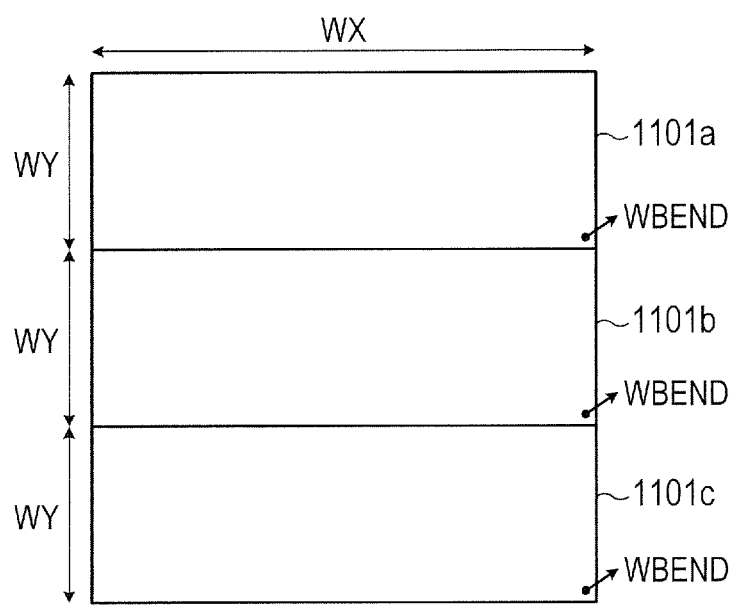
FIG. 11A and FIG. 11B are diagrams conceptually illustrating an example of block division and a frame.
Figure 11B:
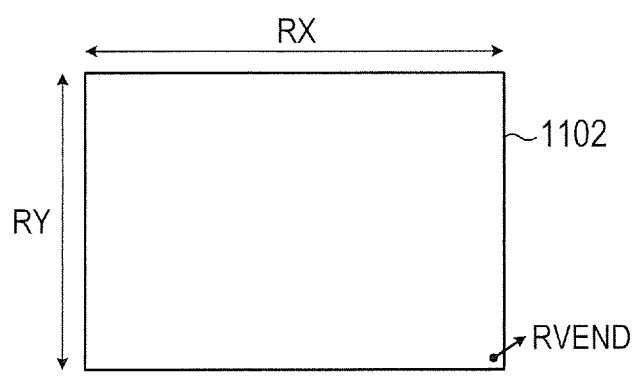

A memory control apparatus and a memory control method according to the second embodiment will be described by using the drawings. Since the configuration of the memory control apparatus according to the present embodiment is the same as the configuration of the memory control apparatus according to the first embodiment, description thereof will be omitted. FIG. 11A and FIG. 11B are diagrams conceptually illustrating an example of block division and a frame. FIG. 11A and FIG. 11B conceptually illustrate a virtual address space corresponding to one frame of an image. FIG. 11A illustrates an example of a way of block division for write operation. As illustrated in FIG. 11A, in the block division for write operation, the number of divisions WYN in the vertical direction is three. On the other hand, there is no division in the horizontal direction. That is, the number of divisions in the horizontal direction is one. In this example, description will be provided with an example where images sequentially processed with a unit of each of divided blocks 1101a to 1101c by the signal processor 103 and/or the magnification processor 104 or the like are sequentially written to the memory 111 in a unit of each of the divided blocks 1101a to 1101c. Note that, in the present specification, the reference numerals 1101a to 1101c will be used when describing an individual divided block used for write operation, and the reference numeral 1101 will be used when generally describing a divided block used for write operation. As illustrated in FIG. 11A, the divided-block access completion event WBEND is output every time writing of data to the memory addresses corresponding to each of the divided blocks 1101*a* to 1101*c* is completed.

FIG. 11B illustrates an example of a frame subjected to readout operation. In this example, as illustrated in FIG. 11B, no block division is made in readout operation, and readout operation is performed with a unit of one frame 1102. That is, readout of one frame of data is one readout operation. Note that the amount of one frame of data is set relatively small. Data read out from the memory 111 is evaluated by the evaluation value acquisition unit 102. As an evaluation value acquired by the evaluation value acquisition unit 102 may be a histogram, an integrated value, or the like, for example. As illustrated in FIG. 11B, the event RVEND indicating the completion of readout of one frame of data is output every time readout operation of one frame of data is completed.

Note that, while a case where the memory addresses corresponding to the divided blocks 1101*a* to 1101*c* are different from the memory addresses corresponding to the frame 1102 will be exemplified, the embodiment is not limited thereto.

In the memory access controller 202, the divided-block access completion event WBEND is selected by the selector 501. Further, in the memory access controller 202, the event RVEND indicating the completion of readout of the frame 1102 is selected by the selector 502. In the present embodiment, respective parameter values are set as follows, for example. That is, C0=0, Un=1, Dn=1, Wn=1, and Rn=0.

Figure 12:
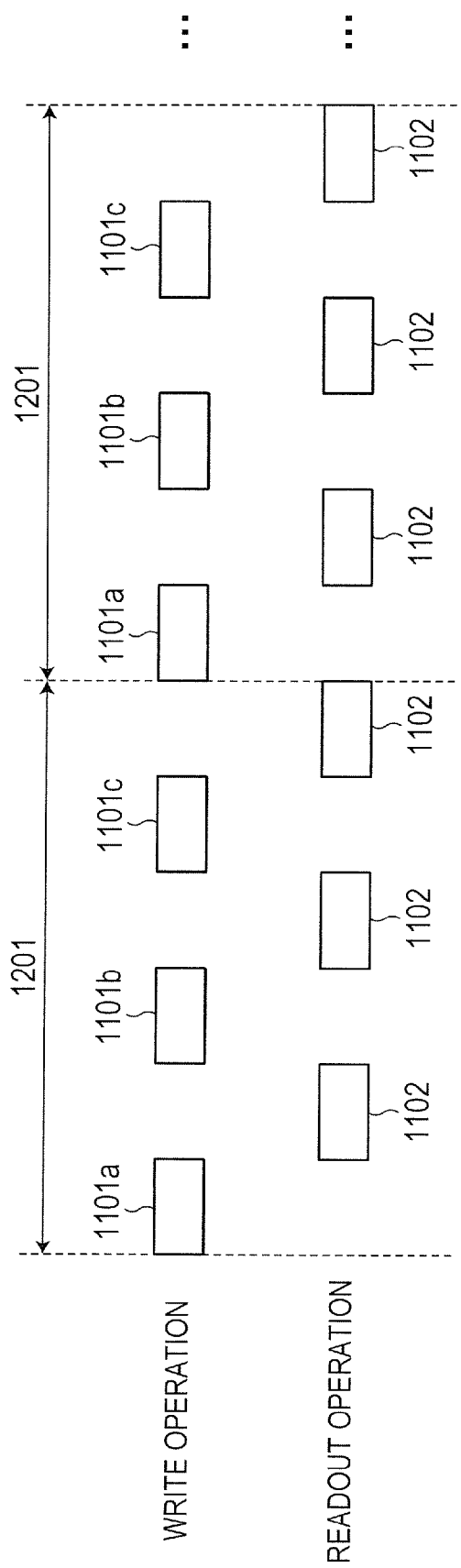
FIG. 12 is a time chart illustrating write operation and readout operation.

FIG. 12 is a time chart illustrating write operation and readout operation performed by the memory control apparatus according to the present embodiment.

First, an initial state will be described. In the initial state, the count value of the up-down counter 505 is set as the initial value C0=0. Since C−Dn=−1 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=1 and Wn=1, the conditional expression C+Un>Wn in the comparator 506 is not satisfied and thus the signal FULL output from the comparator 506 is Low level. Since the signal FULL is Low level, the write request signal WREQ is enabled. Therefore, writing data to the memory addresses corresponding to the first divided block 1101*a* used for write operation is performed.

Upon the completion of writing of data to the memory addresses corresponding to the first divided block 1101*a* used for write operation, the divided-block access completion event WBEND is output. This causes the up-down counter 505 to count up by Un=1, resulting in the count value C=1. Since C+Un=2 and Wn=1, the conditional expression C+Un>Wn in the comparator 506 is satisfied and thus the signal FULL output from the comparator 506 is High level. Since the signal FULL is High level, the write request signal WREQ is disabled. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Therefore, the first readout of data from the memory addresses corresponding to the frame 1102 is performed.

Upon the completion of the first readout of data from the memory addresses corresponding to the frame 1102, the event RVEND indicating the completion of readout of data from the memory addresses corresponding to the frame 1102 is output. This causes the up-down counter 505 to count down by Dn=1, resulting in the count value C=0. Since C−Dn=−1 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=1 and Wn=1, the conditional expression C+Un>Wn in the comparator 506 is not satisfied and thus the signal FULL output from the comparator 506 is Low level. Since the signal FULL is Low level, the write request signal WREQ is enabled. Therefore, writing of data to the memory addresses corresponding to the second divided block 1101*b* used for write operation is performed.

Upon the completion of writing of data to the memory addresses corresponding to the second divided block 1101*b* used for write operation, the divided-block access completion event WBEND is output. This causes the up-down counter 505 to count up by Un=1, resulting in the count value C=1. Since C+Un=2 and Wn=1, the conditional expression C+Un>Wn in the comparator 506 is satisfied and thus the signal FULL output from the comparator 506 is High level. Since the signal FULL is High level, the write request signal WREQ is disabled. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Therefore, the second readout of data from the memory addresses corresponding to the frame 1102 is performed.

Upon the completion of the second readout of data from the memory addresses corresponding to the frame 1102, the event RVEND indicating the completion of readout of data from the memory addresses corresponding to the frame 1102 is output. This causes the up-down counter 505 to count down by Dn=1, resulting in the count value C=0. Since C−Dn=−1 and Rn=0, the conditional expression C−Dn<Rn in the comparator 507 is satisfied and thus the signal EMPTY output from the comparator 507 is High level. Since the signal EMPTY is High level, the readout request signal RREQ is disabled. Further, since C+Un=1 and Wn=1, the conditional expression C+Un>Wn in the comparator 506 is not satisfied and thus the signal FULL output from the comparator 506 is Low level. Since the signal FULL is Low level, the write request signal WREQ is enabled. Therefore, writing of data to the memory addresses corresponding to the third divided block 1101*c* used for write operation is performed.

Upon the completion of writing of data to the memory addresses corresponding to the third divided block 1101*c* used for write operation, the divided-block access completion event WBEND is output. This causes the up-down counter 505 to count up by Un=1, resulting in the count value C=1. Since C+Un=2 and Wn=1, the conditional expression C+Un>Wn in the comparator 506 is satisfied and thus the signal FULL output from the comparator 506 is High level. Since the signal FULL is High level, the write request signal WREQ is disabled. Since C−Dn=0 and Rn=0, the conditional expression C−Dn<Rn in the comparator 507 is not satisfied and thus the signal EMPTY output from the comparator 507 is Low level. Since the signal EMPTY is Low level, the readout request signal RREQ is enabled. Therefore, the third readout of data from the memory addresses corresponding to the frame 1102 is performed.

As discussed above, three times of write operation and three times of readout operation are performed within a single cycle 1201. Three times of write operation included in one cycle 1201 cause one frame of an image to be written to the memory 111. On the other hand, three times of readout operation included in one cycle 1201 cause the same image data to be read out three times. By using respective image data sequentially read out in such a way, three different types of evaluation values are sequentially acquired by the evaluation value acquisition unit 102. That is, from the image data read out by the first readout operation, a first evaluation value is acquired by the evaluation value acquisition unit 102. From the image data read out by the second readout operation, a second evaluation value, which is different from the first evaluation value, is acquired by the evaluation value acquisition unit 102. From the image data read out by the third readout operation, a third evaluation value, which is different from both of the first and second evaluation values, is acquired by the evaluation value acquisition unit 102.

In the subsequent operation, the same process as described above is repeated.

As discussed above, a unit in writing and a unit in readout may be different from each other, and access addresses for writing and access addresses for readout may be different from each other. Also in the present embodiment, an image processing apparatus that can accurately perform readout operation and write operation can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the count value of the up-down counter 505 is counted up or counted down based on the divided-block access completion event BEND in the first embodiment, the embodiment is not limited thereto. For example, the count value of the up-down counter 505 may be counted up or counted down based on the minimum-access-unit access completion event WEND. That is, the minimum access unit 401 may be a block which is a unit in performing a write access or a readout access. In this case, the size of the minimum access unit 401 for write operation and the size of the minimum access unit 401 for readout operation may be different from each other. Further, the minimum access units 401 may be overlapped. Proper settings of respective parameters such as C0, Un, Dn, Wn, Rn, and the like allow for accurate access control. Alternatively, the count value of the up-down counter 505 may be counted up or counted down based on the row access completion event LEND block. That is, the row 411 may be a block which is a unit in performing a write access and/or a readout access. In this case, the size of the row 411 for write operation and the size of the row 411 for readout operation may be different from each other. Further, the rows 411 may be overlapped. Proper settings of respective parameters such as C0, Un, Dn, Wn, Rn, and the like allow for accurate access control. Alternatively, the count value of the up-down counter 505 may be counted up or counted down based on the block-row access completion event BLEND. That is, the block row 431 may be a block which is a unit in performing a write access and/or a readout access. In this case, the size of the block row 431 for write operation and the size of the block row 431 for readout operation may be different from each other. Further, the block rows 431 may be overlapped. Proper settings of respective parameters such as C0, Un, Dn, Wn, Rn, and the like allow for accurate access control. Alternatively, the count value of the up-down counter 505 may be counted up or counted down based on the frame access completion event VEND. That is, the frame 441 may be a block which is a unit in performing a write access and/or a readout access.

Further, the second embodiment has been described with the example in which the number of divisions in block division for write operation is three and write operation of the division block 1101 and readout operation of the frame 1102 are each performed three times in an alternating manner within a single cycle 1201. However, the embodiment is not limited thereto. For example, the number of divisions in block division for write operation may be five, and write operation of the division block and readout operation of the frame may be each performed five times in an alternating manner within a single cycle 1201.

Further, while the second embodiment has been described with the example in which the up-down counter 505 performs count-up and count-down based on the divided-block access completion event BEND and/or the frame access completion event VEND, the embodiment is not limited thereto. For example, the up-down counter 505 may properly perform count-up and count-down based on the minimum-access-unit access completion event WEND, the row access completion event LEND, or the block-row access completion event BLEND.

Further, while the second embodiment has been described with the example in which the write operation for an image is divided and performed within a single cycle 1201 and multiple times of readout operation for the image are performed within the single cycle 1201, the embodiment is not limited thereto. For example, multiple times of write operation for an image may be performed within a single cycle 1201 and the readout operation for the image may be divided and performed within the single cycle 1201.

Further, while the second embodiment has been described with the example in which write operation and readout operation are performed in an alternating manner, the embodiment is not limited thereto. For example, this embodiment can be applied in performing write operation on a first image and write operation on a second image that is different from the first image. In this case, the write controller 201 is replaced with the readout controller 203, and any one of the write request signals MREQ issued from the plurality of write controllers 201 is enabled by the memory access controller 202. Write operation on the divided block of the first image and write operation on the divided block of the second image are repeated in an alternating manner within each of the cycles 1201. Alternatively, this embodiment can be applied in performing readout operation on a first image and readout operation on a second image that is different from the first image. In this case, the readout controller 203 is replaced with the write controller 201, and any one of the readout request signals RREQ issued from the plurality of readout controllers 203 is enabled by the memory access controller 202. Thereby, readout operation on the divided block of the first image and readout operation on the divided block of the second image are repeated in an alternating manner within each of the cycles 1201.

This application claims the benefit of Japanese Patent Application No. 2016-082746, filed Apr. 18, 2016, which is hereby incorporated by reference herein in its entirety.

What is claimed is:

1. A memory control apparatus comprising:
   a writing unit configured to output a write request for writing to a memory and, in response to the write request being permitted, write image data to the memory, wherein a plurality of first blocks are included in one frame of image data to be written to the memory by the writing unit, and the writing unit issues a first event every time a write operation of each of the first blocks is completed;
   a reading unit configured to output a readout request for reading of image data that has been written to the memory by the writing unit and, in response to the readout request being permitted, read out the image data from the memory, wherein, while image data of one frame is being written in the memory by the writing unit, the reading unit outputs a readout request for the image data of the one frame written to the memory, a second block is included in one frame of the image data read out from the memory by the reading unit, and the reading unit issues a second event every time a readout operation of the second block is completed; and
   a controller configured to control whether to permit the write request and the readout request respectively, wherein the controller performs a process of incrementing a count value by a first value based on the number of the second blocks in a horizontal direction included in the one frame in response to the first event, the controller performs a process of decrementing the count value by a second value based on the number of the first blocks in the horizontal direction included in the one frame in response to the second event, the controller does not permit the write request in a case where the count value is larger than a first threshold, and the controller does not permit the readout request in a case where the count value is smaller than a second threshold.

2. The memory control apparatus according to claim 1, wherein
   the controller sets
   the second threshold based on a difference between the number of the first blocks in the horizontal direction included in the one frame and the number of the second blocks in the horizontal direction included in the one frame.

3. The memory control apparatus according to claim 1, wherein the controller has a first comparator that compares the count value with the first threshold, a second comparator that compares the count value with the second threshold, a first mask unit that controls whether to mask a write request from the writing unit in accordance with a comparison result by the first comparator, and a second mask unit that controls whether or not to mask a readout request from the reading unit in accordance with a comparison result by the second comparator.

4. The memory control apparatus according to claim 1, wherein
   the writing unit issues the first event in response to a write address reaching a final address of each of the first blocks, and
   the reading unit issues the second event in response to a readout address reaching a final address of the second block.

5. The memory control apparatus according to claim 1, wherein the controller sets the count value to an initial value in response to completion of readout of the image data of one frame performed by the reading unit.

6. The memory control apparatus according to claim 5, wherein
   the first blocks and the second block are defined by dividing one frame of image data, respectively, and
   the initial value is set in accordance with forms of divisions of the first blocks and the second block.

7. The memory control apparatus according to claim 1, wherein
   the writing unit writes the plurality of first blocks of one frame to the memory in a first predetermined order, and
   the reading unit reads out the plurality of second blocks of one frame from the memory in a second predetermined order which corresponds to the first predetermined order.

8. The memory control apparatus according to claim 1, wherein a size of each of the first blocks is different from a size of the second block.

9. The memory control apparatus according to claim 1, wherein the first blocks and the second block are any one of a minimum access unit, a row including a plurality of minimum access units, a division block defined by dividing one frame in a horizontal direction and a vertical direction, a block row including a plurality of the divided blocks neighboring in the horizontal direction, and one frame, respectively.

10. A memory control method comprising:
    outputting a write request for writing to a memory and, in response to the write request being permitted, writing image data to the memory, wherein a plurality of first blocks are included in one frame of image data to be written to the memory, and a first event is issued every time a write operation of each of the first blocks is completed;
    outputting a readout request for reading of image data that has been written to the memory and, in response to the readout request being permitted, reading out the image data from the memory, wherein, while image data of one frame is being written to the memory, a readout request for image data of the one frame written to the memory is output, a second block is included in one frame of the image data read out from the memory, and a second event is issued every time a readout operation of the second block is completed; and controlling whether to permit the write request and the readout request respectively, wherein a process of incrementing a count value by a first value based on the number of the second blocks in a horizontal direction included in the one frame is performed in response to the first event, a process of decrementing the count value by a second value based on the number of the first blocks in the horizontal direction included in the one frame is performed in response to the second event, the write request is not permitted in a case where the count value is larger than a first threshold, and the readout request is not permitted in a case where the count value is smaller than a second threshold.

11. The memory control apparatus according to claim 1, wherein the second threshold is a value which is obtained by multiplying a difference between the number of the second blocks in the horizontal direction included in the one frame and the number of the second blocks in the horizontal direction included in two frames, the number of the first blocks in the horizontal direction included in the one frame, and the number of the second blocks in the horizontal direction included in the one frame, and the first threshold is a value which is larger than the second threshold, by an amount corresponding to a value obtained by adding a horizontal division number of the first blocks and a horizontal division number of the second blocks.

* * * * *